(12) United States Patent
Kawasaki

(10) Patent No.: US 9,813,624 B2
(45) Date of Patent: Nov. 7, 2017

(54) IMAGE PICKUP APPARATUS INCLUDING INFRARED LIGHT REDUCTION SECTION, METHOD OF CONTROLLING THE SAME, AND STORAGE MEDIUM

(71) Applicant: CANON KABUSHIKI KAISHA, Tokyo (JP)

(72) Inventor: Ryo Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 14/886,403

(22) Filed: Oct. 19, 2015

(65) Prior Publication Data

US 2016/0127659 A1  May 5, 2016

(30) Foreign Application Priority Data

Oct. 29, 2014 (JP) .................. 2014-220204
Oct. 29, 2014 (JP) .................. 2014-220205
Oct. 29, 2014 (JP) .................. 2014-220206

(51) Int. Cl.
  *H04N 5/33* (2006.01)
  *H04N 5/232* (2006.01)
  *H04N 5/225* (2006.01)

(52) U.S. Cl.
  CPC ....... *H04N 5/23245* (2013.01); *H04N 5/2254* (2013.01)

(58) Field of Classification Search
  CPC .................... H04N 5/23245; H04N 5/2254
  USPC ......................................... 348/164
  See application file for complete search history.

(56) References Cited

U.S. PATENT DOCUMENTS

| 2011/0080498 A1* | 4/2011 | Kawada | H04N 5/2254 348/222.1 |
| 2011/0193967 A1* | 8/2011 | Matsumoto | G03B 7/18 348/164 |
| 2013/0194469 A1* | 8/2013 | Nakata | H04N 5/23245 348/300 |

FOREIGN PATENT DOCUMENTS

| JP | 2004-229034 A | 8/2004 |
| JP | 2007-049442 A | 2/2007 |
| JP | 2010-279061 A | 12/2010 |

* cited by examiner

*Primary Examiner* — Zhihan Zhou
(74) *Attorney, Agent, or Firm* — Fitzpatrick, Cella, Harper & Scinto

(57) ABSTRACT

An image pickup apparatus capable of accurately inserting/removing an infrared light reduction section. An infrared cut filter is inserted between a photographic optical system and an image pickup device to reduce infrared light contained in an optical image. If an object luminance acquired based on an optical image is lower than a first threshold, a camera control circuit calculates a second threshold for comparison with the object luminance and a third threshold value for comparison with an object luminance detected by a luminance sensor, based on the object luminances and the first threshold, and one of the second and third thresholds is made equal to or higher than the other. The infrared cut filter is selectively inserted or removed based on the object luminances, the second and third switching threshold values.

14 Claims, 12 Drawing Sheets

IMAGE PICKUP APPARATUS INCLUDING INFRARED LIGHT REDUCTION SECTION, METHOD OF CONTROLLING THE SAME, AND STORAGE MEDIUM

BACKGROUND OF THE INVENTION

Field of the Invention

The present invention relates to an image pickup apparatus including an infrared light reduction section that can be inserted into and removed from an optical path of a photographic optical system, a method of controlling the same, and a storage medium, and more particularly to an image pickup apparatus that inserts or removes the infrared light reduction section according to the luminance of an object.

Description of the Related Art

Conventionally, an image pickup apparatus, such as a digital camera, employs a method of selectively inserting or removing an infrared cut filter which is an infrared light reduction section into or from an optical path of a photographic optical system according to the luminance of an object, and switching a photographing mode (hereinafter referred to as the automatic day/night function).

In the automatic day/night function, when the luminance of an object is higher than a predetermined luminance, near infrared light (having a wavelength of approximately 700 nm or more) is cut by inserting the infrared cut filter into the optical path. On the other hand, when the luminance of an object becomes not higher than the predetermined luminance, the infrared cut filter is removed from the optical path to thereby allow light in the near infrared region to pass and increase the sensitivity.

As described above, if light in the near infrared region is allowed to pass, the color balance of an image is lost, and hence when the infrared cut filter is removed, it is necessary to switch the photographing mode from a color image mode (day mode) to a monochrome image mode (night mode).

Note that the luminance of an object is detected, for example, based on an image signal which is output from an image pickup device, such as a CMOS image sensor, or using a luminance sensor provided separately from the photographic optical system. In a case where the luminance of an object is detected using the luminance sensor, if a photographing range through the photographic optical system and a range of luminance detection by the luminance sensor are different, the luminance of an object is not accurately detected, which makes it impossible to properly switch the photographing mode.

To cope with this problem, for example, there has been proposed a method of correcting the range of luminance detection according to a change in the angle of view of a zoom lens provided in the image pickup optical system to thereby accurately detect the luminance of an object and stabilize switching of the photographing mode (see Japanese Patent Laid-Open Publication No. 2010-279061 and Japanese Patent Laid-Open Publication No. 2007-49442).

However, in the methods described in Japanese Patent Laid-Open Publication No. 2010-279061 and Japanese Patent Laid-Open Publication No. 2007-49442, if the infrared light reflectivity is not uniform in the photographing range through the photographic optical system, an error occurs in correction of the range of luminance detection. Therefore, for example, in a photographing environment in which an object is illuminated with infrared illumination, the infrared light reflectivity is nonuniform in the photographing range through the photographic optical system due to the influence of an object distance or the like, and as a result, it is impossible to stably switch the photographing mode.

Further, there has been proposed an image pickup apparatus that includes an infrared illumination section and illuminates an object with infrared light using the infrared illumination section when in the night mode. This image pickup apparatus positively photographs an object even under low luminance by illuminating the object with infrared light (see Japanese Patent Laid-Open Publication No. 2004-229034).

Incidentally, when the photographing mode is switched based on the object luminance obtained according to the image signal output from the image pickup device, the signal level of the image signal largely varies between a day mode and a night mode. This causes a so-called hunting phenomenon in which the photographing mode is repeatedly switched within a short time.

To prevent the hunting phenomenon, it is envisaged to switch the photographing mode to the day mode in a case where the object luminance becomes higher than an object luminance obtained after switching the photographing mode to the night mode. However, in the image pickup apparatus including the infrared illumination section, if the intensity of light emission by the infrared illumination section changes, it is difficult to switch the photographing mode at a desired timing.

On the other hand, in the image pickup apparatus described in Japanese Patent Laid-Open Publication No. 2004-229034, although the luminance of an object is detected using the luminance sensor provided separately from the photographic optical system, the image pickup apparatus is required to be additionally provided with the luminance sensor, which inevitably increases the costs of the image pickup apparatus itself.

SUMMARY OF THE INVENTION

The present invention provides an image pickup apparatus that is capable of accurately inserting and removing an infrared light reduction section, a method of controlling the same, and a storage medium.

Further, the present invention provides an image pickup apparatus that is capable of switching the photographing mode at a desired timing without causing a hunting phenomenon even when the photographing mode is switched in a case where photographing is performed by illumination with infrared light, a method of controlling the same, and a storage medium.

In a first aspect of the present invention, there is provided an image pickup apparatus including an image pickup device that has an optical image formed thereon through a photographic optical system, and outputs an image signal corresponding to the optical image, comprising an infrared light reduction unit configured to be inserted between the photographic optical system and the image pickup device so as to reduce an amount of infrared light contained in the optical image reaching the image pickup device, a first detection unit configured to detect a luminance of an object according to the image signal to thereby obtain a first detection result, a second detection unit disposed at a location different from a location of the image pickup device and configured to detect a luminance of the object to thereby obtain a second detection result, a processing unit configured to, in a case where the first detection result is lower than a first switching threshold value set in advance, generate a second switching threshold value used for comparison with the first detection result and a third switching threshold value used for comparison with the second detection result, based on the first detection result, the second detection result, and the first switching threshold value, and make one of the second switching threshold value and the third switching threshold value equal to or higher than the other of the second switching threshold value and the third switching threshold value, and an insertion/removal control unit configured to perform insertion/removal control for selectively inserting or removing the infrared light reduction unit into or from an optical path between the photographic optical system and the image pickup device, based on the first detection result, the second detection result, the second switching threshold value, and the third switching threshold value.

In a second aspect of the present invention, there is provided an image pickup apparatus including an image pickup device that has an optical image formed thereon through a photographic optical system, and outputs an image signal corresponding to the optical image, comprising an infrared light reduction unit configured to be inserted between the photographic optical system and the image pickup device so as to reduce an amount of infrared light contained in the optical image reaching the image pickup device, a first detection unit configured to detect a luminance of an object according to the image signal to thereby obtain a first detection result, a second detection unit disposed at a location different from a location of the image pickup device and configured to detect a luminance of the object to thereby obtain a second detection result, a selection unit configured to compare the first detection result and the second detection result, and select one of the first detection result and the second detection result as a selected detection result based on a comparison result, and an insertion/removal control unit configured to perform insertion/removal control for selectively inserting or removing the infrared light reduction unit into or from an optical path between the photographic optical system and the image pickup device according to the selected detection result.

In a third aspect of the present invention, there is provided an image pickup apparatus including an image pickup device that has an optical image formed thereon through a photographic optical system, and outputs an image signal corresponding to the optical image, comprising an infrared light reduction unit configured to be inserted into an optical path between the photographic optical system and the image pickup device so as to reduce an amount of infrared light contained in the optical image reaching the image pickup device, a detection unit configured to detect a luminance of an object according to the image signal to thereby obtain a luminance detection result, an illuminating unit configured to illuminate the object with infrared light, a correction unit configured to correct a threshold value for use in determining insertion or removal of the infrared light reduction unit into or from the optical path, based on a light emission intensity of infrared light emitted by the illuminating unit, and a control unit configured to compare the detection result and a corrected threshold value, and determine insertion of the infrared light reduction unit into the optical path according to the comparison result.

In a fourth aspect of the present invention, there is provided a method of controlling an image pickup apparatus including an image pickup device that has an optical image formed thereon through a photographic optical system, and outputs an image signal corresponding to the optical image, and an infrared light reduction unit configured to be inserted between the photographic optical system and the image pickup device so as to reduce an amount of infrared light contained in the optical image reaching the image pickup device, the method comprising detecting a luminance of an object according to the image signal to thereby obtain a first detection result, detecting a luminance of the object using a luminance sensor disposed at a location different from a location of the image pickup device to thereby obtain a second detection result, generating, in a case where the first detection result is lower than a first switching threshold value set in advance, a second switching threshold value used for comparison with the first detection result and a third switching threshold value used for comparison with the second detection result, based on the first detection result, the second detection result, and the first switching threshold value, and making one of the second switching threshold value and the third switching threshold value equal to or higher than the other of the second switching threshold value and the third switching threshold value, and performing insertion/removal control for selectively inserting or removing the infrared light reduction unit into or from an optical path between the photographic optical system and the image pickup device, based on the first detection result, the second detection result, the second switching threshold value, and the third switching threshold value.

In a fifth aspect of the present invention, there is provided a method of controlling an image pickup apparatus including an image pickup device that has an optical image formed thereon through a photographic optical system, and outputs an image signal corresponding to the optical image, and an infrared light reduction unit configured to be inserted between the photographic optical system and the image pickup device so as to reduce an amount of infrared light contained in the optical image reaching the image pickup device, the method comprising detecting a luminance of an object according to the image signal to thereby obtain a first detection result, detecting a luminance of the object using a luminance sensor disposed at a location different from a location of the image pickup device to thereby obtain a second detection result, comparing the first detection result and the second detection result, and selecting one of the first detection result and the second detection result as a selected detection result based on a comparison result, and performing insertion/removal control for selectively inserting or removing the infrared light reduction unit into or from an optical path between the photographic optical system and the image pickup device according to the selected detection result.

In a sixth aspect of the present invention, there is provided a method of controlling an image pickup apparatus including an image pickup device that has an optical image formed thereon through a photographic optical system, and outputs an image signal corresponding to the optical image, an infrared light reduction unit configured to be inserted into an optical path between the photographic optical system and the image pickup device so as to reduce an amount of infrared light contained in the optical image reaching the image pickup device, and an illuminating unit configured to illuminate the object with infrared light, the method comprising detecting a luminance of an object according to the image signal to thereby obtain a luminance detection result, correcting a threshold value for use in determining insertion or removal of the infrared light reduction unit into or from the optical path, based on a light emission intensity of infrared light emitted by the illuminating unit, and comparing the detection result and a corrected threshold value, and determining insertion of the infrared light reduction unit into the optical path according to the comparison result.

In a seventh aspect of the present invention, there is provided a non-transitory computer-readable storage medium storing a computer-executable control program for causing a computer to execute a method of controlling an image pickup apparatus including an image pickup device that has an optical image formed thereon through a photographic optical system, and outputs an image signal corresponding to the optical image, and an infrared light reduction unit configured to be inserted between the photographic optical system and the image pickup device so as to reduce an amount of infrared light contained in the optical image reaching the image pickup device, wherein the method comprises detecting a luminance of an object according to the image signal to thereby obtain a first detection result, detecting a luminance of the object using a luminance sensor disposed at a location different from a location of the image pickup device to thereby obtain a second detection result, generating, in a case where the first detection result is lower than a first switching threshold value set in advance, a second switching threshold value used for comparison with the first detection result and a third switching threshold value used for comparison with the second detection result, based on the first detection result, the second detection result, and the first switching threshold value, and making one of the second switching threshold value and the third switching threshold value equal to or higher than the other of the second switching threshold value and the third switching threshold value, and performing insertion/removal control for selectively inserting or removing the infrared light reduction unit into or from an optical path between the photographic optical system and the image pickup device, based on the first detection result, the second detection result, the second switching threshold value, and the third switching threshold value.

In an eighth aspect of the present invention, there is provided a non-transitory computer-readable storage medium storing a computer-executable control program for causing a computer to execute a method of controlling an image pickup apparatus including an image pickup device that has an optical image formed thereon through a photographic optical system, and outputs an image signal corresponding to the optical image, and an infrared light reduction unit configured to be inserted between the photographic optical system and the image pickup device so as to reduce an amount of infrared light contained in the optical image reaching the image pickup device, wherein the method comprises detecting a luminance of an object according to the image signal to thereby obtain a first detection result, detecting a luminance of the object using a luminance sensor disposed at a location different from a location of the image pickup device to thereby obtain a second detection result, comparing the first detection result and the second detection result, and selecting one of the first detection result and the second detection result as a selected detection result based on a comparison result, and performing insertion/removal control for selectively inserting or removing the infrared light reduction unit into or from an optical path between the photographic optical system and the image pickup device according to the selected detection result.

In a ninth aspect of the present invention, there is provided a non-transitory computer-readable storage medium storing a computer-executable control program for causing a computer to execute a method of controlling an image pickup apparatus including an image pickup device that has an optical image formed thereon through a photographic optical system, and outputs an image signal corresponding to the optical image, an infrared light reduction unit configured to be inserted into an optical path between the photographic optical system and the image pickup device so as to reduce an amount of infrared light contained in the optical image reaching the image pickup device, and an illuminating unit configured to illuminate the object with infrared light, wherein the method comprises detecting a luminance of an object according to the image signal to thereby obtain a luminance detection result, correcting a threshold value for use in determining insertion or removal of the infrared light reduction unit into or from the optical path, based on a light emission intensity of infrared light emitted by the illuminating unit, and comparing the detection result and a corrected threshold value, and determining insertion of the infrared light reduction unit into the optical path according to the comparison result.

According to the present invention, it is possible to accurately and stably insert and remove the infrared light reduction section. Further, in the case where photographing is performed by illumination with infrared light, it is possible to switch the photographing mode at a desired timing without causing a hunting phenomenon even when the photographing mode is switched.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
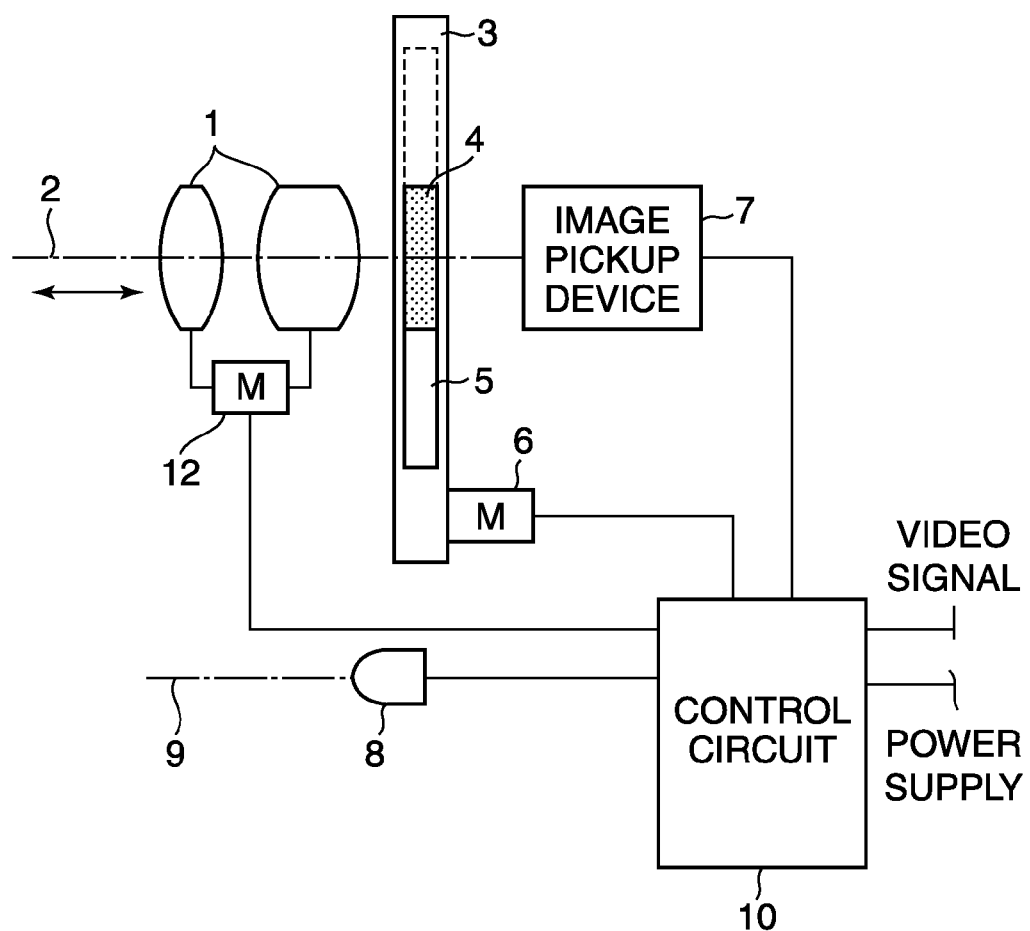
FIG. 1 is a schematic diagram of a digital camera as an image pickup apparatus according to a first embodiment of the present invention.

FIG. 1 is a schematic diagram of an image pickup apparatus according to a first embodiment of the present invention.

The image pickup apparatus shown in FIG. 1 is e.g. a digital camera (hereinafter simply referred to as the camera), and includes a plurality of photographing lenses 1 which form a photographic optical system. A filter switching mechanism 3 is arranged downstream of the photographic optical system, and is provided with a filter part including an infrared cut filter 4 (infrared light reduction unit) and a transparent substrate 5. The infrared cut filter 4 may be a filter that completely blocks infrared light, or a filter that does not completely block infrared light but provides a sufficient light reduction effect with a light shielding ratio of not lower than a predetermined value (e.g. not lower than 90%), insofar as it reduces an amount of infrared light reaching an image pickup device 7.

The filter part is movable in a direction orthogonal to (intersecting with) an optical axis (i.e. an optical path) 2 of the photographic optical system, and the infrared cut filter 4 or the transparent substrate 5 is selectively positioned on the optical axis 2 in accordance with the movement of the filter part. More specifically, an infrared cut filter insertion/removal motor 6 is driven under the control of a control circuit 10, whereby the infrared cut filter 4 or the transparent substrate 5 can be selectively inserted onto or removed from the optical axis 2 (in other words, the infrared cut filter 4 can be inserted into or removed from the optical path).

The image pickup device 7, such as a CMOS image sensor, is provided downstream of the filter switching mechanism 3, and an optical image (object image) is formed on the image pickup device 7 through the photographic optical system. Then, the image pickup device 7 outputs an image signal corresponding to the optical image to the control circuit 10.

A luminance sensor 8 is connected to the control circuit 10. The luminance sensor 8 receives light from a direction of an optical axis 9 thereof, and detects the luminance within a photographing range through the photographic optical system. The luminance sensor 8 has substantially the same spectral sensitivity characteristics as those of the image pickup device 7 and the infrared cut filter 4 exhibited when the infrared cut filter 4 is positioned on the optical axis 2.

The control circuit 10 controls the overall operation of the camera. The control circuit 10 controls input of power supply, and outputs a video signal corresponding to an image signal.

At least one of the photographing lenses 1 is a zoom lens, and the control circuit 10 controls the driving of a zoom motor 12 to thereby move the photographing lenses 1 along the optical axis 2 and thereby change the photographing lenses 1 in a range between a wide angle end and a telephoto end.

Figure 2:
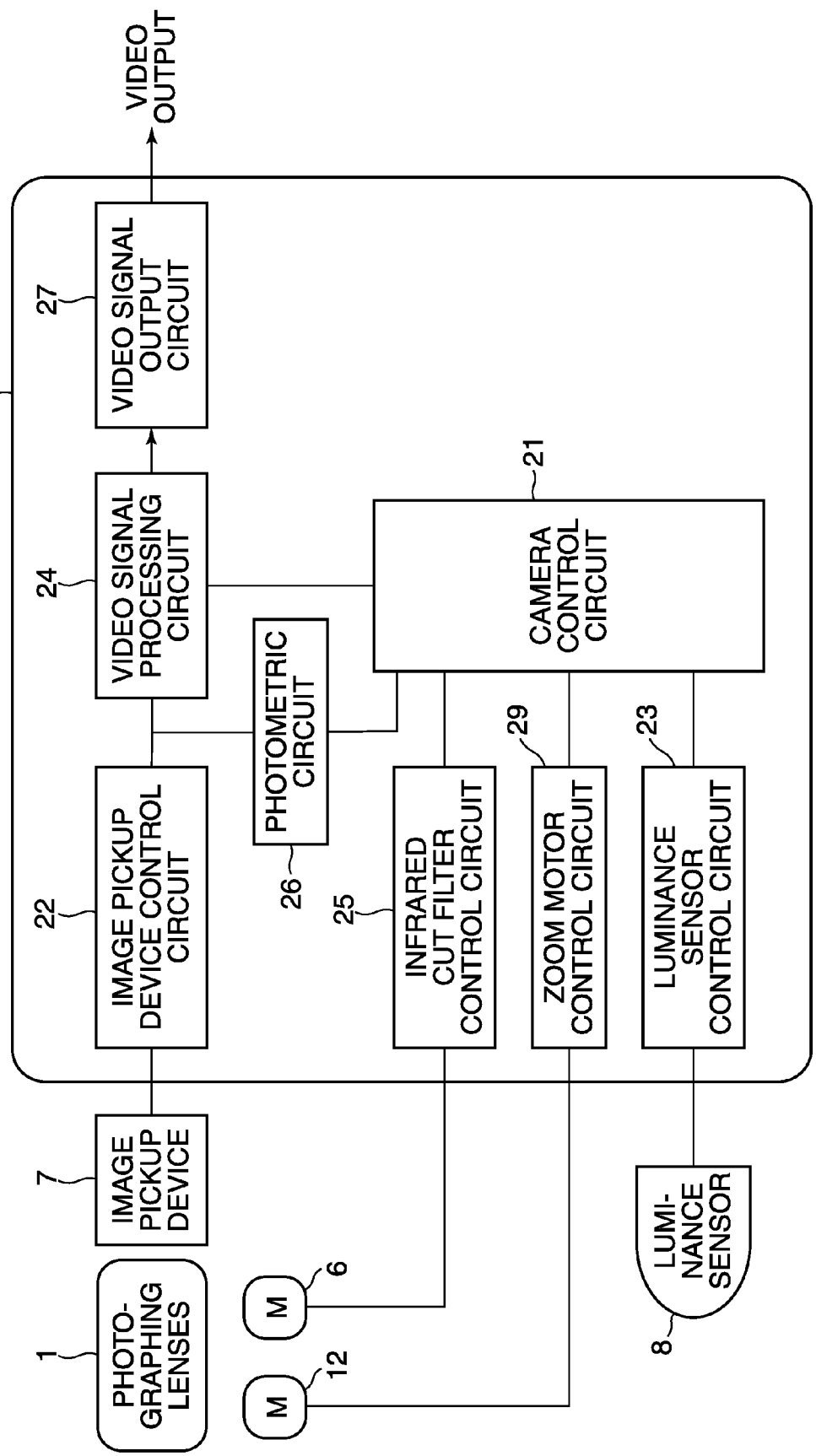
FIG. 2 is a block diagram of a control circuit appearing in FIG. 1.

FIG. 2 is a block diagram of the control circuit 10 appearing in FIG. 1. Note that in FIG. 2, the filter switching mechanism 3 appearing in FIG. 1 is omitted and only one photographing lens 1 is illustrated.

The control circuit 10 includes a camera control circuit 21, an image pickup device control circuit 22, a luminance sensor control circuit 23, a video signal processing circuit 24, an infrared cut filter control circuit 25, a photometric circuit 26, a video signal output circuit 27, and a zoom motor control circuit 29.

In photographing, an optical image incident through the photographing lenses 1 passes through the IR cut filter 4 or the transparent substrate 5 and is formed on the image pickup device 7. The image pickup device control circuit 22 controls reading from the image pickup device 7 to thereby cause the image pickup device 7 to output an image signal corresponding to the optical image. Then, the image pickup device control circuit 22 sends the image signal to the photometric circuit 26 and the video signal processing circuit 24.

The video signal processing circuit 24 performs predetermined signal processing on the image signal, and thereby generates a color or monochrome video signal. Then, this video signal is output to the outside by the video signal output circuit 27.

The photometric circuit 26 measures a luminance of an object according to the image signal, and sends a first detection result indicative of the luminance measured thereby to the camera control circuit 21. The luminance sensor 8 is controlled by the luminance sensor control circuit 23, and the luminance sensor control circuit 23 sends a second detection result indicative of a luminance detected by the luminance sensor 8 to the camera control circuit 21.

The camera control circuit 21 controls the infrared cut filter control circuit 25 according to the first and second detection results. With this control, the infrared cut filter control circuit 25 controls driving of the infrared cut filter insertion/removal motor 6.

The camera control circuit 21 controls driving of the zoom motor 12 by the zoom motor control circuit 29 to thereby move the photographing lenses 1 along the optical axis 2 and thereby change the photographing lenses 1 in the range between the wide angle end and the telephoto end.

Figure 3:
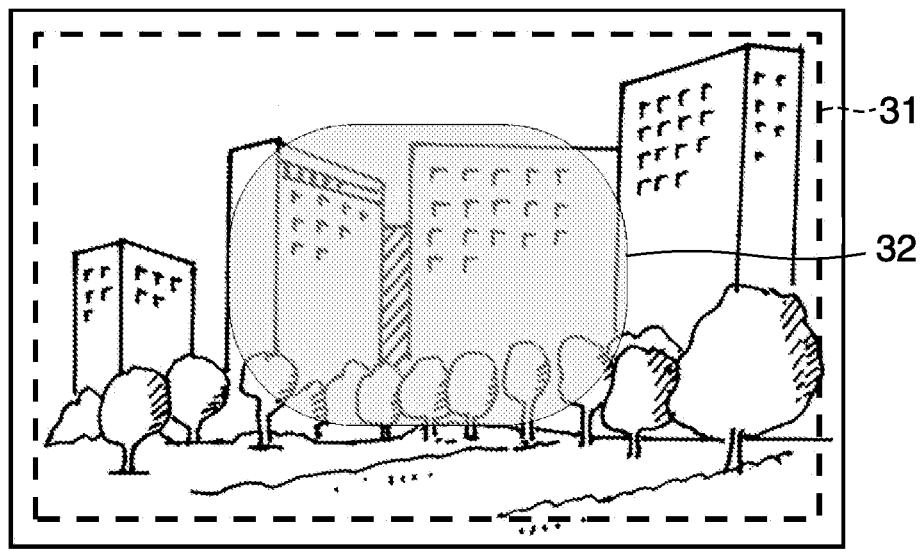
FIG. 3 is a diagram useful in explaining a relationship between a photographing range and a range of luminance detection by a luminance sensor in the digital camera shown in FIG. 1.

FIG. 3 is a diagram useful in explaining a relationship between the photographing range and the range of luminance detection by the luminance sensor 8, in the camera shown in FIG. 1.

FIG. 3 shows an example of a case where the photographing lenses 1 is set to the wide angle end, and in this case, the photographing range, denoted by reference numeral 31, is larger than the range of luminance detection, denoted by reference numeral 32.

Figure 4:
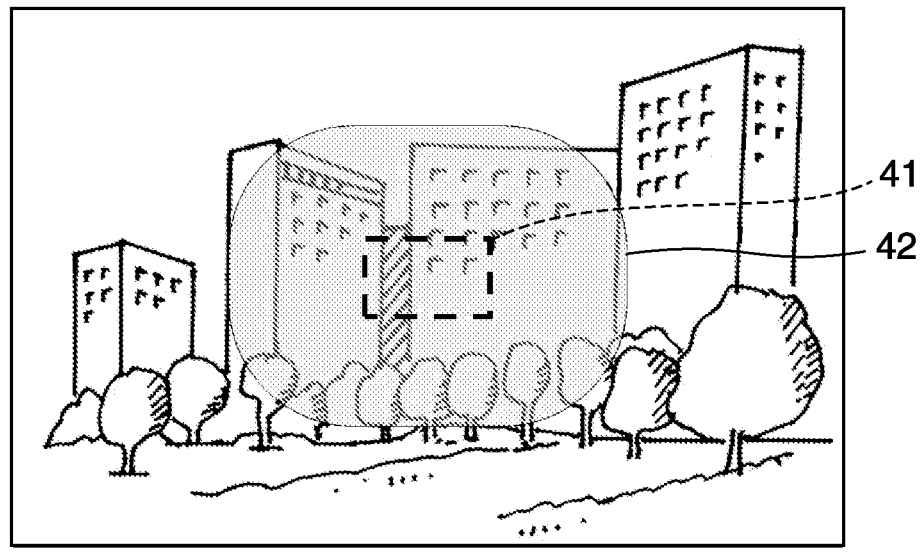
FIG. 4 is a diagram useful in explaining another example of the relationship between the photographing range and the range of luminance detection by the luminance sensor in the digital camera shown in FIG. 1.

FIG. 4 is a diagram useful in explaining another example of the relationship between the photographing range and the range of luminance detection by the luminance sensor 8, in the camera shown in FIG. 1.

FIG. 4 shows an example of a case where the photographing lenses 1 is set to the telephoto end, and in this case, the photographing range, denoted by reference numeral 41, is smaller than the range of luminance detection, denoted by reference numeral 42.

Here, a description will be given of an operation performed by the camera shown in FIG. 1, for switching the photographing mode between a day mode (color photographing mode) and a night mode (monochrome photographing mode).

Figure 5:
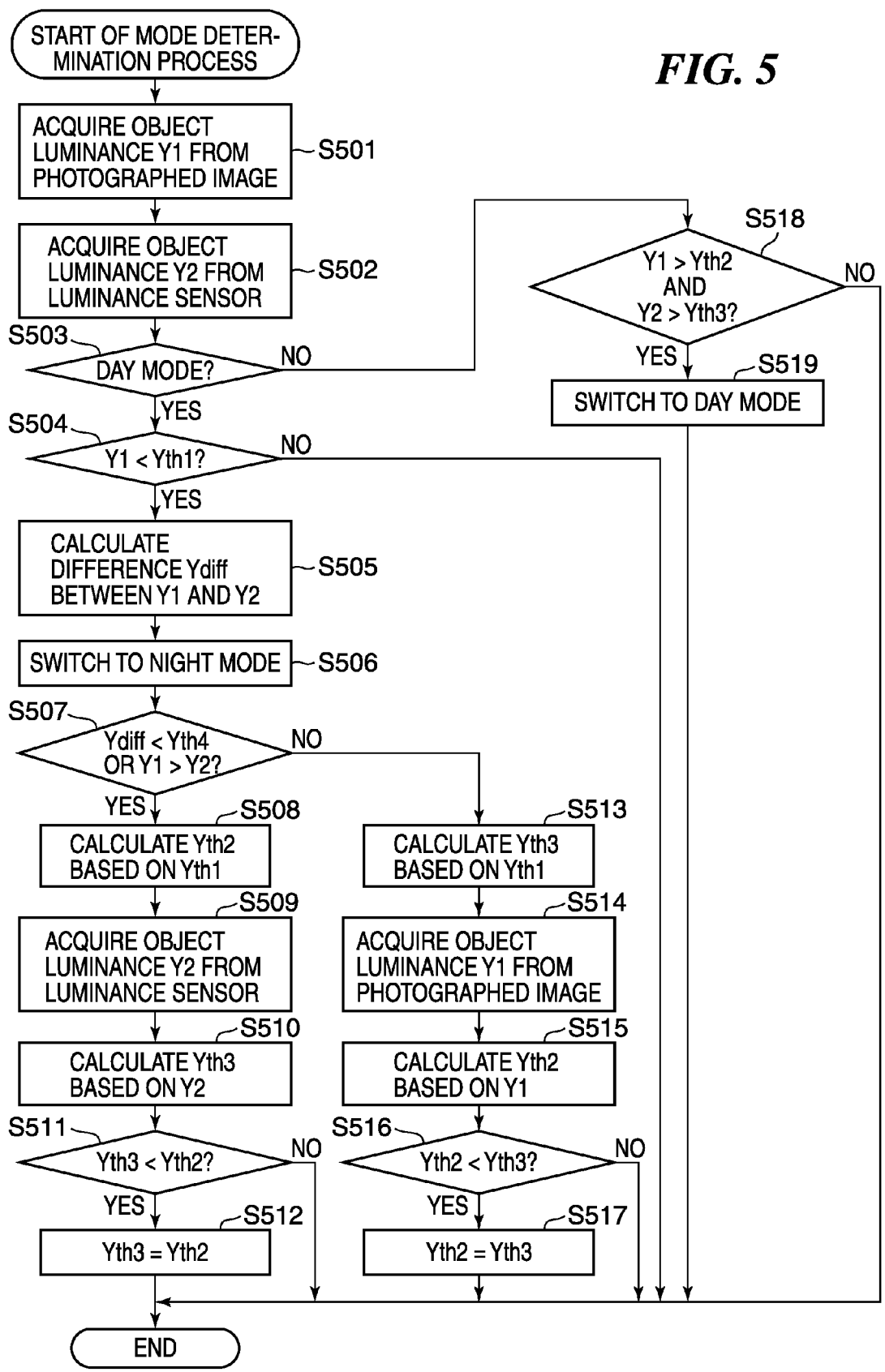
FIG. 5 is a flowchart of a mode determination process for a mode switching operation performed by the digital camera shown in FIG. 1.

FIG. 5 is a flowchart of a mode determination process for the mode switching operation performed by the camera shown in FIG. 1. The mode determination process in FIG. 5 is performed under the control of the camera control circuit 21, and is automatically and repeatedly executed when the camera is in a power-on state, for example.

When the mode determination process is started, the camera control circuit 21 obtains the first detection result (object luminance Y1) from the photometric circuit 26 (step S501). Then, the camera control circuit 21 obtains the second detection result (object luminance Y2) from the luminance sensor control circuit 23 (step S502).

Next, the camera control circuit 21 determines whether or not the current photographing mode is the day mode (step S503). If the current photographing mode is the day mode (YES to the step S503), the camera control circuit 21 compares the object luminance Y1 with a first switching threshold value Yth1 set in advance, and determines whether or not the object luminance Y1<the first switching threshold value Yth1 holds (step S504).

Note that the first switching threshold value Yth1 is a threshold value with reference to which the photographing mode is switched from the day mode to the night mode.

If the object luminance Y1<the first switching threshold value Yth1 holds (i.e. if the object luminance Y1 is lower than the first switching threshold value) (YES to the step S504), the camera control circuit 21 calculates a difference Ydiff between the object luminances Y1 and Y2 (step S505). Then, the camera control circuit 21 switches the photographing mode from the day mode to the night mode (step S506). At this time, in accordance with the switching from the day mode to the night mode, the camera control circuit 21 controls the infrared cut filter control circuit 25 to remove the infrared cut filter 4 from the optical axis 2.

Then, the camera control circuit 21 compares the difference Ydiff with a difference threshold value Yth4 set in advance and compares the object luminance Y1 with the object luminance Y2, to thereby determine based on the comparison results whether or not the difference Ydiff<the difference threshold value Yth4 or the object luminance Y1>the object luminance Y2 holds (step S507).

If the difference Ydiff<the difference threshold value Yth4 or the object luminance Y1>the object luminance Y2 holds (YES to the step S507), the camera control circuit 21 calculates a second switching threshold value Yth2 based on the first switching threshold value Yth1 (step S508).

The second switching threshold value Yth2 is a threshold value with reference to which the photographing mode is switched from the night mode to the day mode, and for example, the second switching threshold value Yth2 is calculated by an equation Yth2=Yth1+α.

The above-mentioned variable α represents hysteresis for preventing occurrence of hunting in switching the photographing mode, and when the variable α is set to a larger value, it is possible to more proactively prevent occurrence of hunting. On the other hand, when the variable α is set to a smaller value, it is possible to more quickly switch the photographing mode from the night mode to the day mode.

Next, the camera control circuit 21 obtains the object luminance Y2 detected by the luminance sensor 8 from the luminance sensor control circuit 23 again (step S509). The step S509 is performed because the object luminance Y2 in the step S502 is sometimes changed by the influence of infrared light on the output from the luminance sensor 8.

Then, the camera control circuit 21 calculates a third switching threshold value Yth3 based on the object luminance Y2 which is obtained in the step S509 and with reference to which the photographing mode is switched from the night mode to the day mode (step S510). Here, the camera control circuit 21 calculates the third switching threshold value Yth3 e.g. by an equation Yth3=Y2+α.

Then, the camera control circuit 21 compares the second switching threshold value Yth2 the third switching threshold value Yth3 with each other, and determines whether or not the third switching threshold value Yth3<the second switching threshold value Yth2 holds (step S511).

If the third switching threshold value Yth3<the second switching threshold value Yth2 holds (YES to the step S511), the camera control circuit 21 makes the third switching threshold value Yth3 equal to the second switching threshold value Yth2 (step S512). Then, the camera control circuit 21 terminates the mode determination process.

On the other hand, if the third switching threshold value Yth3≥the second switching threshold value Yth2 holds (NO to the step S511), the camera control circuit 21 terminates the mode determination process. With these processing operations, the third switching threshold value Yth3 is made always equal to or higher than the second switching threshold value Yth2.

If the difference Ydiff≥the difference threshold value Yth4 holds and also the object luminance Y1≤the object luminance Y2 (the first detection result is not higher than the second detection result) holds (NO to the step S507), the camera control circuit 21 calculates the third switching threshold value Yth3 based on the first switching threshold value Yth1 (step S513).

The third switching threshold value Yth3 is a threshold value with reference to which the photographing mode is switched from the night mode to the day mode as mentioned above, and for example, the third switching threshold value Yth3 is calculated e.g. by an equation Yth3=Yth1+α.

Next, the camera control circuit 21 obtains the object luminance Y1 detected based the image signal from the photometric circuit 26 again (step S514). The step S514 is executed because the object luminance Y1 obtained in the step S501 changes due to switching of the photographing mode to the night mode in which light including near infrared light is received.

Then, the camera control circuit 21 calculates the second switching threshold value Yth2 based on the object luminance Y1 obtained in the step S514 (step S515). Here, the camera control circuit 21 calculates the second switching threshold value Yth2 e.g. by an equation Yth2=Y1+α.

Then, the camera control circuit 21 compares the second switching threshold value Yth2 and the third switching threshold value Yth3 with each other, and determines whether or not the second switching threshold value Yth2<the third switching threshold value Yth3 holds (step S516).

If the second switching threshold value Yth2<the third switching threshold value Yth3 holds (YES to the step S516), the camera control circuit 21 makes the second switching threshold value Yth2 equal to the third switching threshold value Yth3 (step S517). Then, the camera control circuit 21 terminates the mode determination process.

On the other hand, if the second switching threshold value Yth2≥the third switching threshold value Yth3 holds (NO to the step S516), the camera control circuit 21 terminates the mode determination process. With these processing operations, the second switching threshold value Yth2 is always made equal to or higher than the third switching threshold value Yth3.

Thus, in the steps S508 to S517, processing for making one of the second switching threshold value and the third switching threshold value equal to or higher than the other is performed.

If the object luminance Y1≥the first switching threshold value Yth1 holds (NO to the step S504), the camera control circuit 21 terminates the mode determination process.

If the current photographing mode is not the day mode (NO to the step S503), i.e. if the photographing mode is the night mode, the camera control circuit 21 compares the object luminance Y1 with the second switching threshold value Yth2, and compares the object luminance Y2 with the third switching threshold value Yth3. Then, the camera control circuit 21 determines based on these comparison results whether or not the object luminance Y1>the second switching threshold value Yth2 holds and also the object luminance Y2>the third switching threshold value Yth3 holds (step S518).

If the object luminance Y1>the second switching threshold value Yth2 holds and also the object luminance Y2>the third switching threshold value Yth3 holds (YES to the step S518), the camera control circuit 21 switches the photographing mode from the night mode to the day mode (step S519). At this time, in accordance with the switching from the night mode to the day mode, the camera control circuit 21 controls the infrared cut filter control circuit 25 to insert the infrared cut filter 4 onto the optical axis 2. Then, the camera control circuit 21 terminates the mode determination process.

On the other hand, if the object luminance Y1≤the second switching threshold value Yth2 or the object luminance Y2≤the third switching threshold value Yth3 holds (NO to the step S518), the camera control circuit 21 terminates the mode determination process.

As described above, in the first embodiment, the second switching threshold value Yth2 and the third switching threshold value Yth3 are adjusted based on the difference Ydiff between the object luminance Y1 and the object luminance Y2.

In this adjustment, if the difference Ydiff is smaller than the predetermined difference threshold value Yth4 (smaller than the difference threshold value), it is judged that reliability of the object luminance Y2 is high, and the camera control circuit 21 makes the third switching threshold value Yth3 equal to or higher than the second switching threshold value Yth2, and switches the photographing mode from the night mode to the day mode while attaching importance to the object luminance Y2. That is, the camera control circuit 21 inserts the infrared cut filter 4 onto the optical axis 2 while attaching importance to the object luminance Y2.

On the other hand, if the difference Ydiff is not smaller than the predetermined difference threshold value Yth4 (not smaller than the difference threshold value), it is judged that reliability of the object luminance Y2 is low, and the camera control circuit 21 makes the second switching threshold value Yth2 equal to or higher than the third switching threshold value Yth3, and switches the photographing mode from the night mode to the day mode while attaching importance to the object luminance Y1. That is, the camera control circuit 21 inserts the infrared cut filter 4 onto the optical axis 2 while attaching importance to the object luminance Y1.

As a result, in the first embodiment, even when the photographing range through the photographic optical system and the range of luminance detection by the luminance sensor are different, and the infrared light reflectivity in the photographic range is not uniform, it is possible to stabilize switching of the photographing mode. Further, it is possible to accurately and stably insert and remove the infrared cut filter 4.

Although in the above-described first embodiment, the difference is calculated when comparing the object luminance Y1 and the object luminance Y2 with each other, in place of the difference, a ratio between the object luminance Y1 and the object luminance Y2, for example, may be used.

More specifically, in a case where a first determination result is obtained which indicates either that the ratio between the object luminance Y1 and the object luminance Y2 is lower than a ratio threshold value set in advance, or that the object luminance Y1 is higher than the object luminance Y2, the second switching threshold value is generated based on the first switching threshold value, and the third switching threshold value is generated based on the object luminance Y2. Then, first processing is performed in which the third switching threshold value is made equal to or higher than the second switching threshold value.

Further, in a case where a second determination result is obtained which indicates that the ratio between the object luminance Y1 and the object luminance Y2 is not lower than the ratio threshold value, and also that the object luminance Y1 is not higher than the object luminance Y2, the third switching threshold value is generated based on the first switching threshold value, and the second switching threshold value is generated based on the object luminance Y1. Then, second processing is performed in which the second switching threshold value is made equal to or higher than the third switching threshold value.

Next, a description will be given of a camera as an image pickup apparatus according to a second embodiment of the present invention. Note that also in the camera according to the second embodiment, the photographing range and the range of luminance detection have the same relationship as shown in FIGS. 3 and 4.

Figure 6:
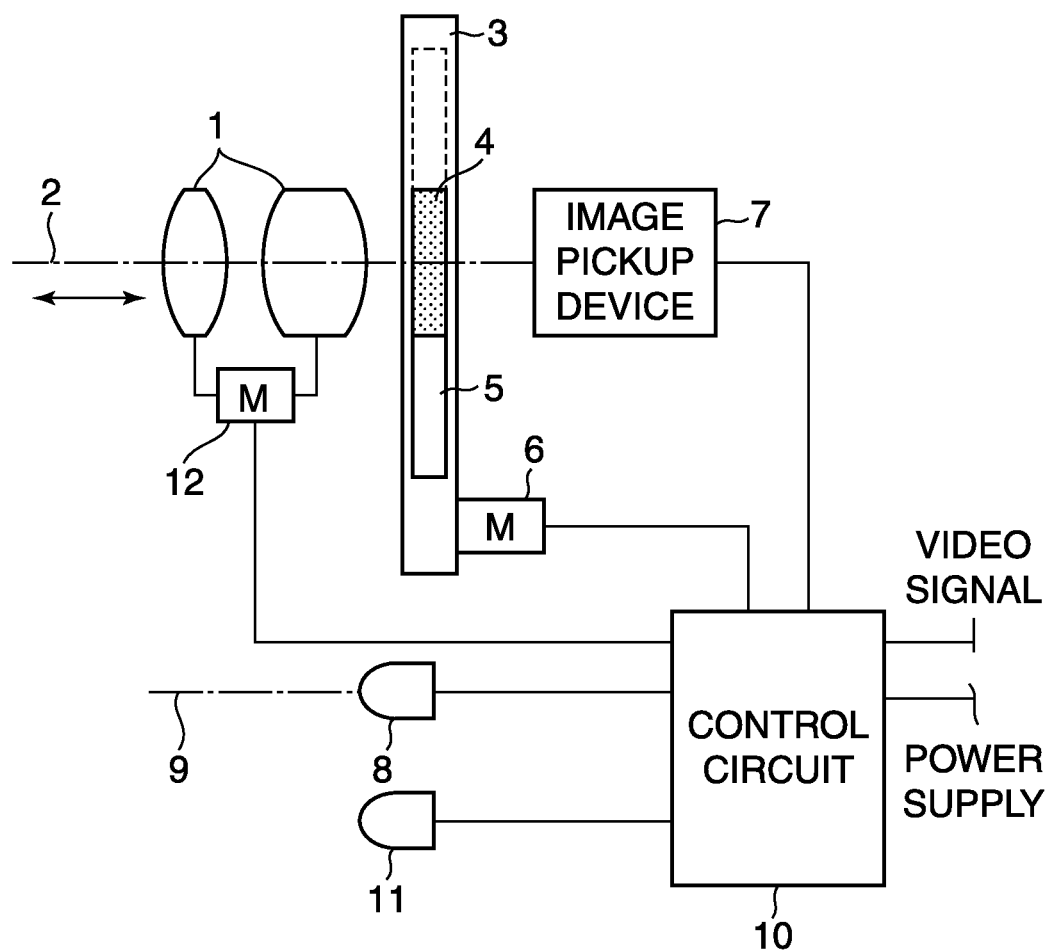
FIG. 6 is a schematic diagram of a digital camera as an image pickup apparatus according to a second embodiment.

FIG. 6 is a schematic diagram of the camera as the image pickup apparatus according to the second embodiment. The same components of the camera shown in FIG. 6 as those of the camera shown in FIG. 1 are denoted by the same reference numerals, and description thereof is omitted.

The control circuit 10 has not only the luminance sensor 8 but also an infrared illumination section 11 connected thereto, and the infrared illumination section 11 illuminates an object with infrared light using e.g. an LED as a light source under the control of the control circuit 10.

Figure 7:
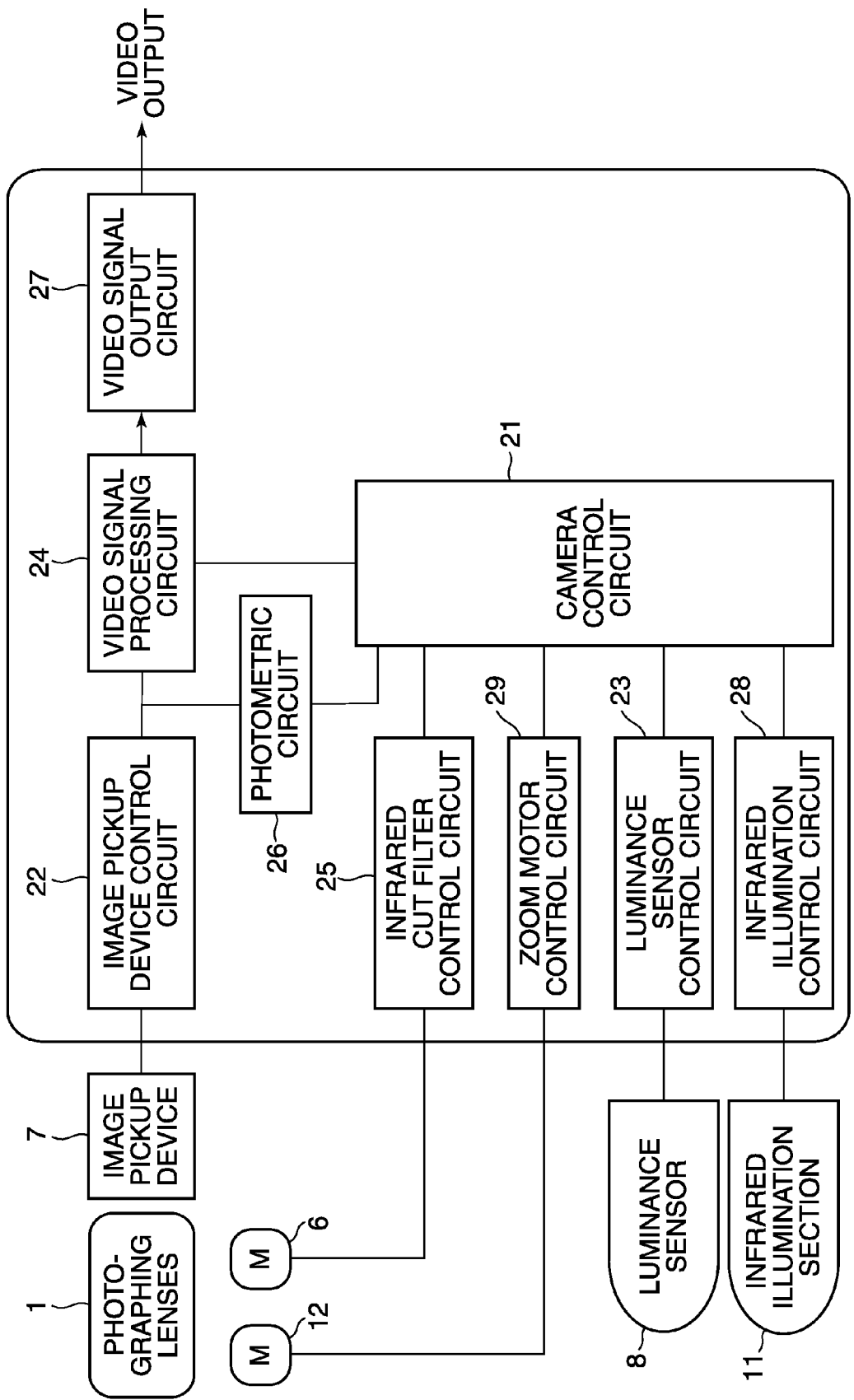
FIG. 7 is a block diagram of a control circuit appearing in FIG. 6.

FIG. 7 is a block diagram of the control circuit 10 appearing in FIG. 6. The same components of the control circuit shown in FIG. 7 as those of the control circuit shown in FIG. 2 are denoted by the same reference numerals, and description thereof is omitted.

The control circuit 10 includes an infrared illumination control circuit 28 in addition to the component elements described with reference to FIG. 2. The camera control circuit 21 controls the infrared illumination control circuit 28 according to the first and second detection results. With this control, the infrared illumination control circuit 28 controls driving of the infrared illumination section 11.

Figure 8:
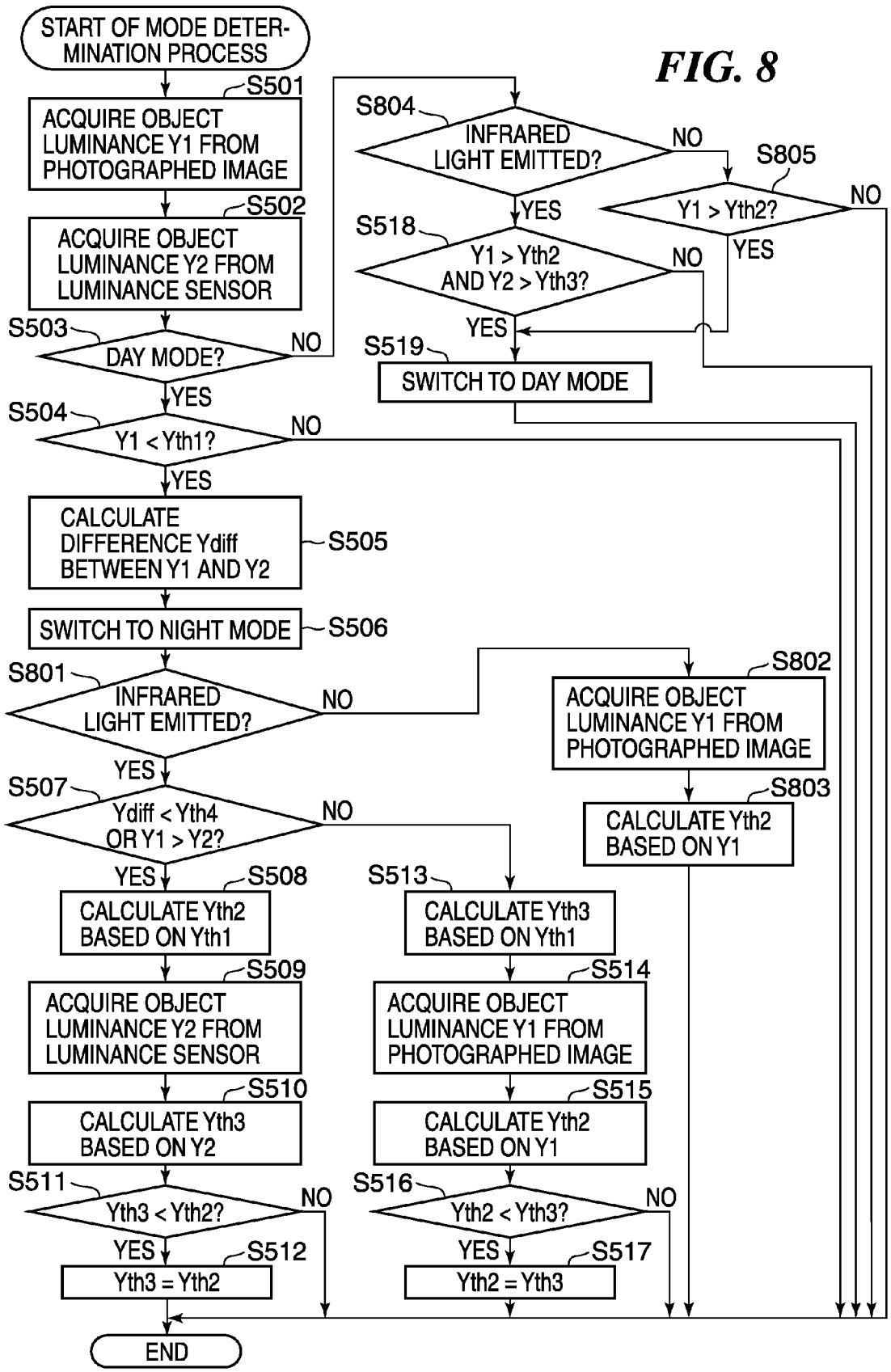
FIG. 8 is a flowchart of a mode determination process for a mode switching operation performed by the digital camera shown in FIG. 6.

FIG. 8 is a flowchart of a mode determination process for the mode switching operation performed by the camera shown in FIG. 6. The same steps of the mode determination process in FIG. 8 as those of the mode determination process in FIG. 5 are denoted by the same step numbers, and description thereof is omitted.

After the photographing mode has been switched from the day mode to the night mode in the step S506, the camera control circuit 21 determines whether or not infrared light is being emitted by the infrared illumination section 11 (step S801). If infrared light is being emitted by the infrared illumination section 11 (YES to the step S801), the camera control circuit 21 proceeds to the step S507.

If infrared light is not being emitted by the infrared illumination section 11 (NO to the step S801), the camera control circuit 21 obtains the object luminance Y1 detected according to the image signal from the photometric circuit 26 again (step S802). The step S802 is performed because the object luminance Y1 obtained in the step S501 changes due to switching of the photographing mode to the night mode in which light including near infrared light is received.

Then, the camera control circuit 21 calculates the second switching threshold value Yth2 based on the object luminance Y1 obtained in the step S802 (step S803). Here, the camera control circuit 21 calculates the second switching threshold value Yth2 e.g. by the equation Yth2=Y1+α. Then, the camera control circuit 21 terminates the mode determination process.

If the current photographing mode is not the day mode (NO to the step S503), i.e. if the current photographing mode is the night mode, the camera control circuit 21 determines whether or not infrared light is being emitted by the infrared illumination section 11 (step S804). If infrared light is being emitted by the infrared illumination section 11 (YES to the step S804), the camera control circuit 21 proceeds to the above-described step S518.

On the other hand, if infrared light is not being emitted by the infrared illumination section (NO to the step S804), the camera control circuit 21 determines whether or not the object luminance Y1>the second switching threshold value Yth2 holds (step S805). If the object luminance Y1>the second switching threshold value Yth2 holds (YES to the step S805), the camera control circuit 21 proceeds to the step S519.

If the object luminance Y1≤the second switching threshold value Yth2 holds (NO to the step S805), the camera control circuit 21 terminates the mode determination process.

As described above, in the second embodiment, in a case where infrared illumination is not being performed, it is judged that an error in the object luminance Y1 is small, and the switching control for switching the photographing mode from the night mode to the day mode is performed based on the object luminance Y1 and the second switching threshold value Yth2. That is, the camera control circuit 21 inserts the infrared cut filter 4 onto the optical axis 2 based on the object luminance Y1 and the second switching threshold value Yth2.

With this, in a case where infrared illumination is not being performed, it is possible to stably switch the photographing mode regardless of a difference between the photographic range through the photographic optical system and the range of luminance detection by the luminance sensor. Further, it is possible to accurately and stably insert and remove the infrared cut filter 4.

Although also in the above-described second embodiment, the difference is calculated when comparing the object luminance Y1 and the object luminance Y2 with each other, similarly to the first embodiment, in place of the difference, a ratio between the object luminance Y1 and the object luminance Y2, for example, may be used for switching the photographing mode.

As is clear from the above, in the first and second embodiments, the photometric circuit 26 functions as a first detection unit, and the luminance sensor 8 and the luminance sensor control circuit 23 function as a second detection unit.

Further, the camera control circuit 21 functions as a processing unit and a mode switching control unit, and the camera control circuit 21 and the infrared cut filter insertion/removal motor 6 function as an insertion/removal control unit.

Figure 9:
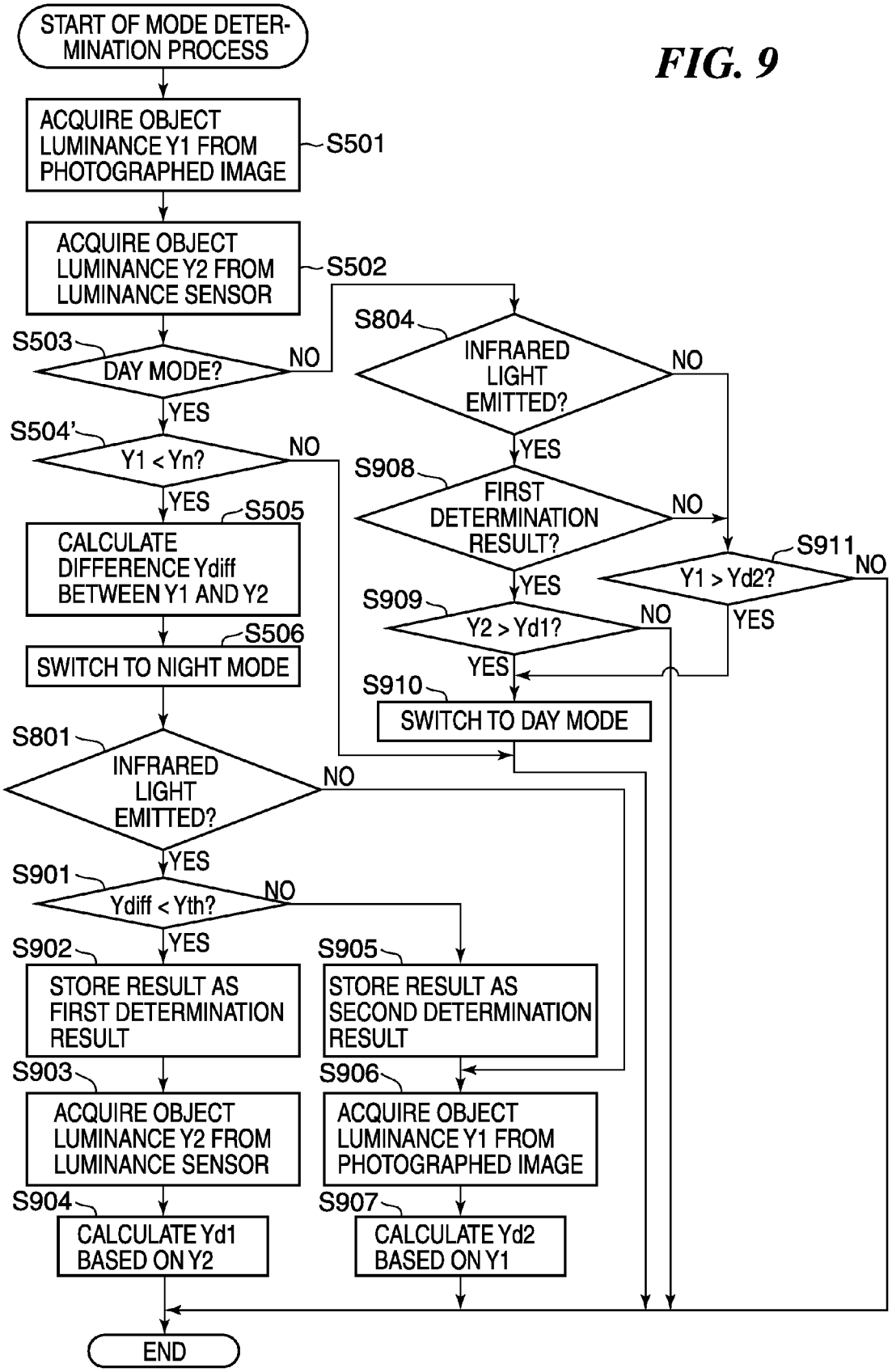
FIG. 9 is a flowchart of a first variation of the mode determination process for the mode switching operation performed by the digital camera shown in FIG. 6.

FIG. 9 is a flowchart of a first variation of the mode determination process for the mode switching operation performed by the camera shown in FIG. 6. The same steps of the mode determination process in FIG. 9 as those of the mode determination process in FIG. 8 are denoted by the same step numbers, and description thereof is omitted.

In the mode determination process in FIG. 9, if it is determined in the step S503 that the photographing mode is not the day mode (NO to the step S503), i.e. if the current photographing mode is the night mode, in a step S504' corresponding to the step S504 of the mode determination process in FIG. 8, the camera control process 21 compares the object luminance Y1 with a luminance threshold value Yn set in advance, and determines whether or not the object luminance Y1<the luminance threshold value Yn holds.

If the object luminance Y1<the luminance threshold value Yn holds (if the object luminance Y1 is smaller than the luminance threshold value) (YES to the step S504'), the camera control circuit 21 calculates the difference Ydiff between the object luminance Y1 and the object luminance Y2 in the step S505, switches the photographing mode from the day mode to the night mode in the step S506, and then proceeds to the step S801.

As a result of the determination of whether or not infrared light is being emitted by the infrared illumination section 11 in the step S801, if it is determined that infrared light is being emitted by the infrared illumination section 11 (YES to the step S801), the camera control circuit 21 compares the difference Ydiff with a difference threshold value Yth set in advance, and determines based on the comparison result whether or not the difference Ydiff<the difference threshold value Yth holds (step S901).

If the difference Ydiff<the difference threshold value Yth holds (i.e. if the difference is smaller than the difference threshold value) (YES to the step S901), the camera control circuit 21 stores the determination result in an internal memory thereof as a first determination result (step S902). Then, the camera control circuit 21 obtains the object luminance Y2 detected by the luminance sensor 8 from the luminance sensor control circuit 23 again (step S903).

The step S903 is performed because infrared light is being emitted by the infrared illumination section 11, and this is because the object luminance Y2 obtained in the step S502 is changed by the influence of infrared illumination on the output from the luminance sensor 8.

Then, the camera control circuit 21 calculates, based on the object luminance Y2 obtained in the step S903, a first switching threshold value Yd1 with reference to which the photographing mode is switched from the night mode to the day mode (step S904).

In this step, the camera control circuit 21 calculates the first switching threshold value Yd1 e.g. by an equation Yd1=Y2+α. After the step S904, the camera control circuit 21 terminates the mode determination process.

The above-mentioned variable α represents hysteresis for preventing occurrence of hunting in switching the photographing mode, and when the variable α is set to a larger value, it is possible to more proactively prevent occurrence of hunting. On the other hand, when the variable α is set to a smaller value, it is possible to more quickly switch the photographing mode from the night mode to the day mode.

Note that in a case where the first switching threshold value Yd1 is not higher than the luminance threshold value Yn, after the photographing mode is switched from the night mode to the day mode, there is a fear that the answer to the question of the step S504' becomes affirmative (YES), which causes the photographing mode to be switched to the night mode again. To prevent this, the first switching threshold value Yd1 is required to be higher than the luminance threshold value Yn. Therefore, the first switching threshold value Yd1 has a lower limit value set thereto.

If the difference Ydiff≥the difference threshold value Yth holds (i.e. if the difference is not smaller than the difference threshold value) (NO to the step S901), the camera control circuit 21 stores the determination result in the internal memory as a second determination result (step S905). Then, the camera control circuit 21 obtains the object luminance Y1 detected according to the image signal from the photometric circuit 26 again (step S906).

The step S906 is executed because the object luminance Y1 obtained in the step S501 changes due to switching of the photographing mode to the night mode in which light including near infrared light is received.

Then, the camera control circuit 21 calculates a second switching threshold value Yd2 with reference to which the photographing mode is switched from the night mode to the day mode, based on the object luminance Y1 obtained in the step S513 (step S907). Here, the camera control circuit 21 calculates the second switching threshold value Yd2 e.g. by an equation Yd2=Y1+α.

Similar to the first switching threshold value Yd1, the second switching threshold value Yd2 also has a lower limit value set thereto. After the step S907, the camera control circuit 21 terminates the mode determination process.

If infrared light is not being emitted by the infrared illumination section 11 (NO to the step S801), the camera control circuit 21 proceeds to the step S906. Further, if the object luminance Y1≥the luminance threshold value Yn holds (NO to the step S504'), the camera control circuit 21 terminates the mode determination process.

If the current photographing mode is not the day mode (NO to the step S503), i.e. if the photographing mode is the night mode, the camera control circuit 21 determines whether or not infrared light is being emitted by the infrared illumination section 11 (step S804). If infrared light is being emitted by the infrared illumination section 11 (YES to the step S804), the camera control circuit 21 determines whether or not the determination result stored in the internal memory is the first determination result (step S908).

If the determination result stored in the internal memory is the first determination result (YES to the step S908), the camera control circuit 21 selects the object luminance Y2 as the selected luminance detection result, and compares the object luminance Y2 with the first switching threshold value Yd1 to thereby determine whether or not the object luminance Y2>the first switching threshold value Yd1 holds (step S909).

If the object luminance Y2>the first switching threshold value Yd1 holds (YES to the step S909), the camera control circuit 21 switches the photographing mode from the night mode to the day mode (step S910). At this time, in accordance with the switching from the night mode to the day mode, the camera control circuit 21 controls the infrared cut filter control circuit 25 to insert the infrared cut filter 4 onto the optical axis 2. Then, the camera control circuit 21 terminates the mode determination process.

If the object luminance Y2≤the first switching threshold value Yd1 holds (NO to the step S909), the camera control circuit 21 terminates the mode determination process.

If infrared light is not being emitted by the infrared illumination section 11 (NO to the step S804), the camera control circuit 21 selects the object luminance Y1 as the selected luminance detection result, and compares the object luminance Y1 with the second switching threshold value Yd2 to thereby determine whether or not the object luminance Y1>the second switching threshold value Yd2 holds (step S911). If the object luminance Y1>the second switching threshold value Yd2 holds (YES to the step S911), the camera control circuit 21 proceeds to the step S910 to switch the photographing mode from the night mode to the day mode.

On the other hand, if the object luminance Y1≤the second switching threshold value Yd2 holds (NO to the step S911), the camera control circuit 21 terminates the mode determination process.

If the determination result stored in the internal memory is not the first determination result (NO to the step S908), i.e. if the determination result stored in the internal memory is the second determination result, the camera control circuit 21 proceeds to the step S911 to determine whether or not the object luminance Y1>the second switching threshold value Yd2 holds.

As described above, in the first variation of the mode determination process performed by the camera as the image pickup apparatus according to the second embodiment, in a case where infrared illumination is being performed, which object luminance is to be used in the switching control for switching the photographing mode from the night mode to the day mode is determined based on the difference Ydiff between the object luminance Y1 and the object luminance Y2.

In the first variation, if the difference Ydiff is smaller than the predetermined difference threshold value Yth, it is judged that the difference between the photographing range and the range of luminance detection is small, and hence the reliability of the object luminance Y2 is high, so that the camera control circuit 21 controls the switching of the photographing mode from the night mode to the day mode, based on the object luminance Y2. That is, the camera control circuit 21 inserts the infrared cut filter 4 onto the optical axis 2 based on the object luminance Y2.

On the other hand, if the difference Ydiff is not smaller than the predetermined difference threshold value Yth, it is judged that the difference between the photographing range and the range of luminance detection is large, and hence the reliability of the object luminance Y2 is low, so that the camera control circuit 21 controls the switching of the photographing mode from the night mode to the day mode, based on the object luminance Y1. That is, the camera control circuit 21 inserts the infrared cut filter 4 onto the optical axis 2 based on the object luminance Y1.

Further, in a case where infrared illumination is not being performed, an infrared component in a photographed image is less, and hence it is judged that the reliability of the object luminance Y1 is high, and the camera control circuit 21 controls the switching of the photographing mode from the night mode to the day mode, based on the object luminance Y1. That is, the camera control circuit 21 inserts the infrared cut filter 4 onto the optical axis 2 based on the object luminance Y1.

This makes it possible to perform the mode switching control using the object luminance Y1 or Y2 suitable for the photographic scene. That is, it is possible to accurately switch the photographing mode even when the infrared light reflectivity is different. Further, it is possible to accurately and stably insert and remove the infrared cut filter 4.

Although in the above-described first variation, the difference is calculated when comparing the object luminance Y1 and the object luminance Y2 with each other, in place of the difference, a ratio between the object luminance Y1 and the object luminance Y2, for example, may be used.

More specifically, in a case where a first determination result is obtained which indicates that the ratio between the object luminance Y1 and the object luminance Y2 is lower than a ratio threshold value set in advance, the camera control circuit 21 performs the control of insertion/removal of the IR cut filter based on the object luminance Y2. Further, in a case where a second determination result is obtained which indicates that the above-mentioned ratio is not lower than the ratio threshold valued, the camera control circuit 21 performs the control of insertion/removal of the IR cut filter based on the object luminance Y1.

Figure 10:
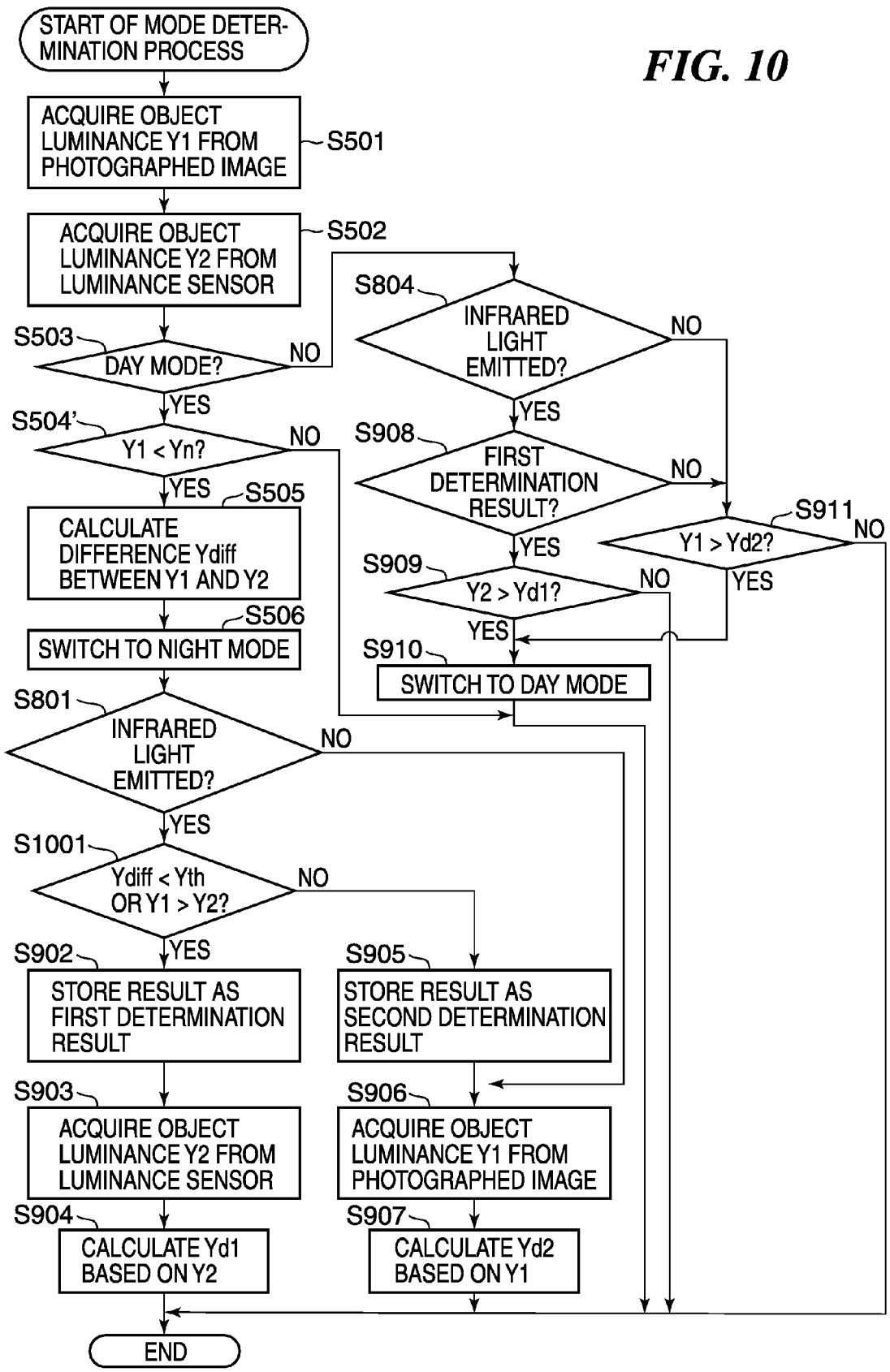
FIG. 10 is a flowchart of a second variation of the mode determination process for the mode switching operation performed by the digital camera shown in FIG. 6.

FIG. 10 is a flowchart of a second variation of the mode determination process for the mode switching operation performed by the camera as the image pickup apparatus according to the second embodiment.

The same steps of the mode determination process in FIG. 10 as those of the mode determination process in FIG. 9 are denoted by the same step numbers, and description thereof is omitted.

If it is determined in the step S801 that infrared illumination is performed (YES to the step S801), the camera control circuit 21 determines whether or not the difference Ydiff<the difference threshold value Yth or the object luminance Y1>the object luminance Y2 holds (step S1001). If the difference Ydiff<the difference threshold value Yth or the object luminance Y1>the object luminance Y2 holds (YES to the step S1001), the camera control circuit 21 proceeds to the step S902, and stores the determination result in the internal memory as the first determination result.

On the other hand, if the difference Ydiff≥the difference threshold value Yth holds and also the object luminance Y1≤the object luminance Y2 holds (the first detection result is not higher than the second detection result) (NO to the step S1001), the camera control circuit 21 proceeds to the step S905, and stores the determination result in the internal memory as the second determination result.

As described above, in the second variation, even when the difference Ydiff between the object luminance Y1 and the object luminance Y2 is not smaller than the difference threshold value Yth, if the object luminance Y1 is higher than the object luminance Y2, it is judged that the object luminance Y2 which is still lower than the object luminance Y1 which is lower than the luminance threshold value Yn is substantially equivalent to the object luminance Y1, and the reliability of the object luminance Y2 is high. Then, the camera control circuit 21 controls the switching of the photographing mode from the night mode to the day mode based on the object luminance Y2. That is, the camera control circuit 21 inserts the infrared cut filter 4 onto the optical axis 2 based on the object luminance Y2.

With this, in the second embodiment, it is possible to perform the mode switching control using the object luminance suitable for the photographic scene with less influence by illumination with infrared light than in the first embodiment. That is, it is possible to accurately switch the photographing mode even when the infrared light reflectivity is different.

Note that although in the above-described second variation as well, the difference is calculated when comparing the object luminance Y1 and the object luminance Y2 with each other, in place of the difference, a ratio between the object luminance Y1 and the object luminance Y2, for example, may be used.

More specifically, in a case where a first determination result is obtained which indicates either that the ratio between the object luminance Y1 and the object luminance Y2 is lower than a ratio threshold value set in advance, or that the object luminance Y1 is higher than the object luminance Y2, the camera control circuit 21 performs the control of insertion/removal of the IR cut filter based on the object luminance Y2. On the other hand, in a case where a second determination result is obtained which indicates that the above-mentioned ratio is not lower than the ratio threshold value, and also that the object luminance Y1 is not higher than the object luminance Y2, the camera control circuit 21 performs the control of insertion/removal of the IR cut filter based on the object luminance Y1.

As is clear from the above description, in the second embodiment, the photometric circuit 26 functions as the first detection unit, and the luminance sensor 8 and the luminance sensor control circuit 23 function as the second detection unit. Further, the camera control circuit 21 functions as a selection unit and the mode switching control unit, and the camera control circuit 21 and the infrared cut filter insertion/removal motor 6 function as the insertion/removal control unit.

Figure 11:
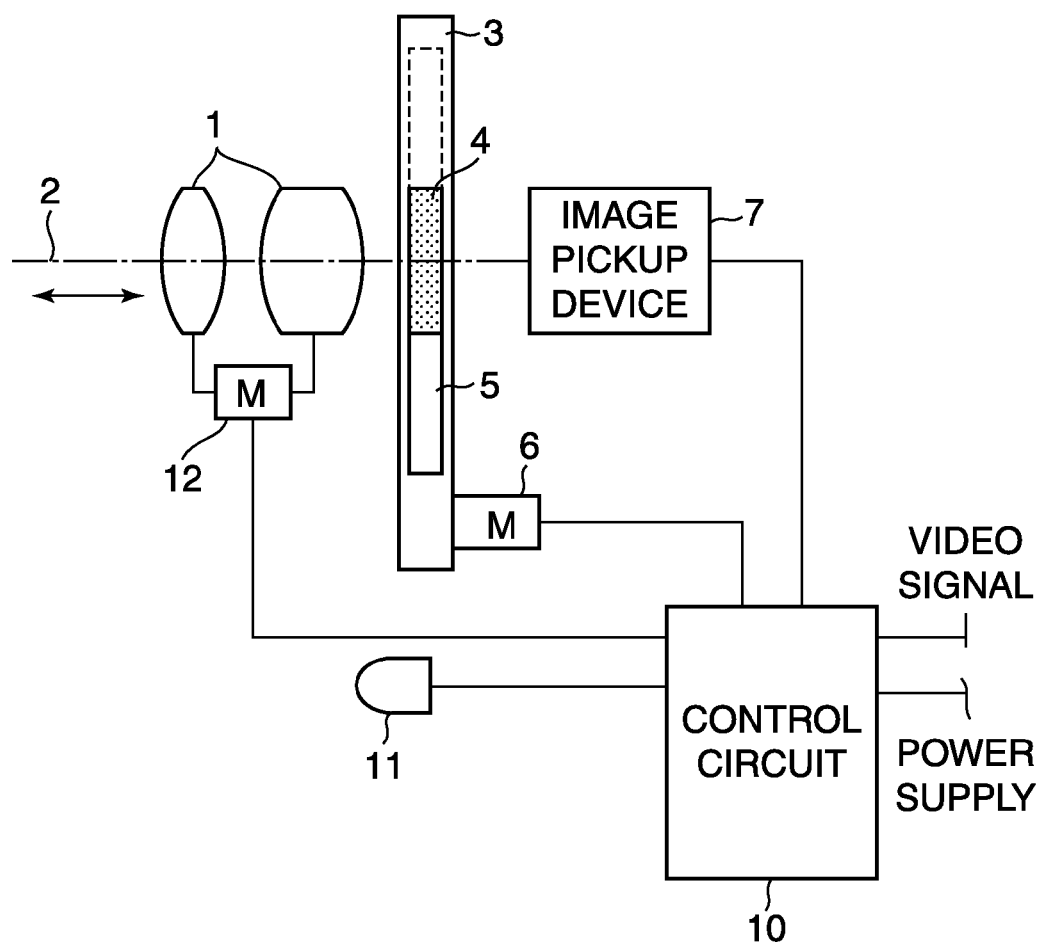
FIG. 11 is a schematic diagram of a digital camera as an image pickup apparatus according to a third embodiment.
Figure 12:
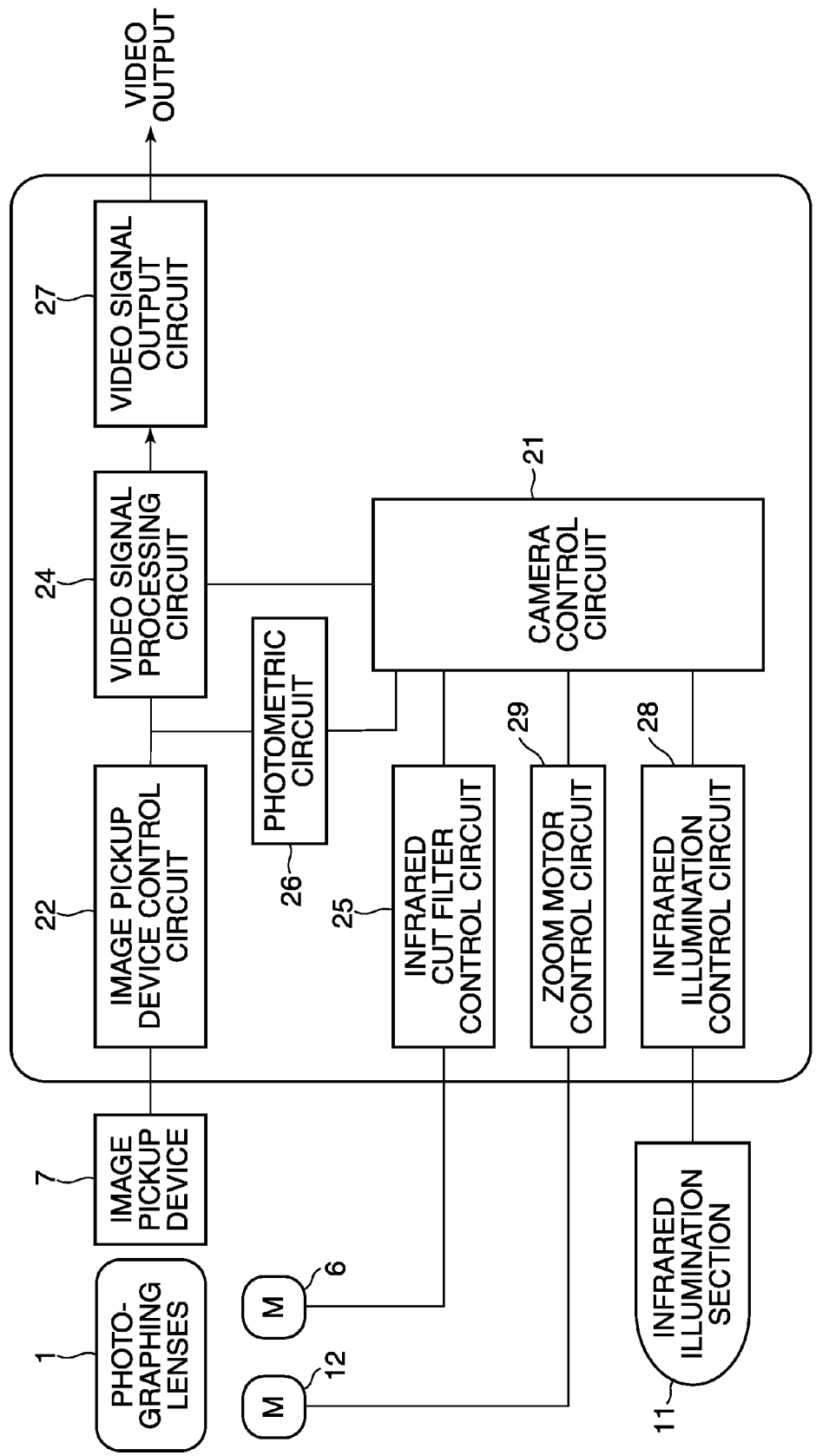
FIG. 12 is a block diagram of a control circuit appearing in FIG. 11.

Next, a description will be given of a third embodiment of the present invention. FIG. 11 is a schematic diagram of a camera as an image pickup apparatus according to the third embodiment. FIG. 12 is a block diagram of the control circuit 10 appearing in FIG. 11. The third embodiment differs from the second embodiment in that the luminance sensor 8 appearing in FIG. 6 is omitted in FIG. 11, and the luminance sensor 8 and the luminance sensor control circuit 23 appearing in FIG. 7 are omitted in FIG. 12.

Figure 13:
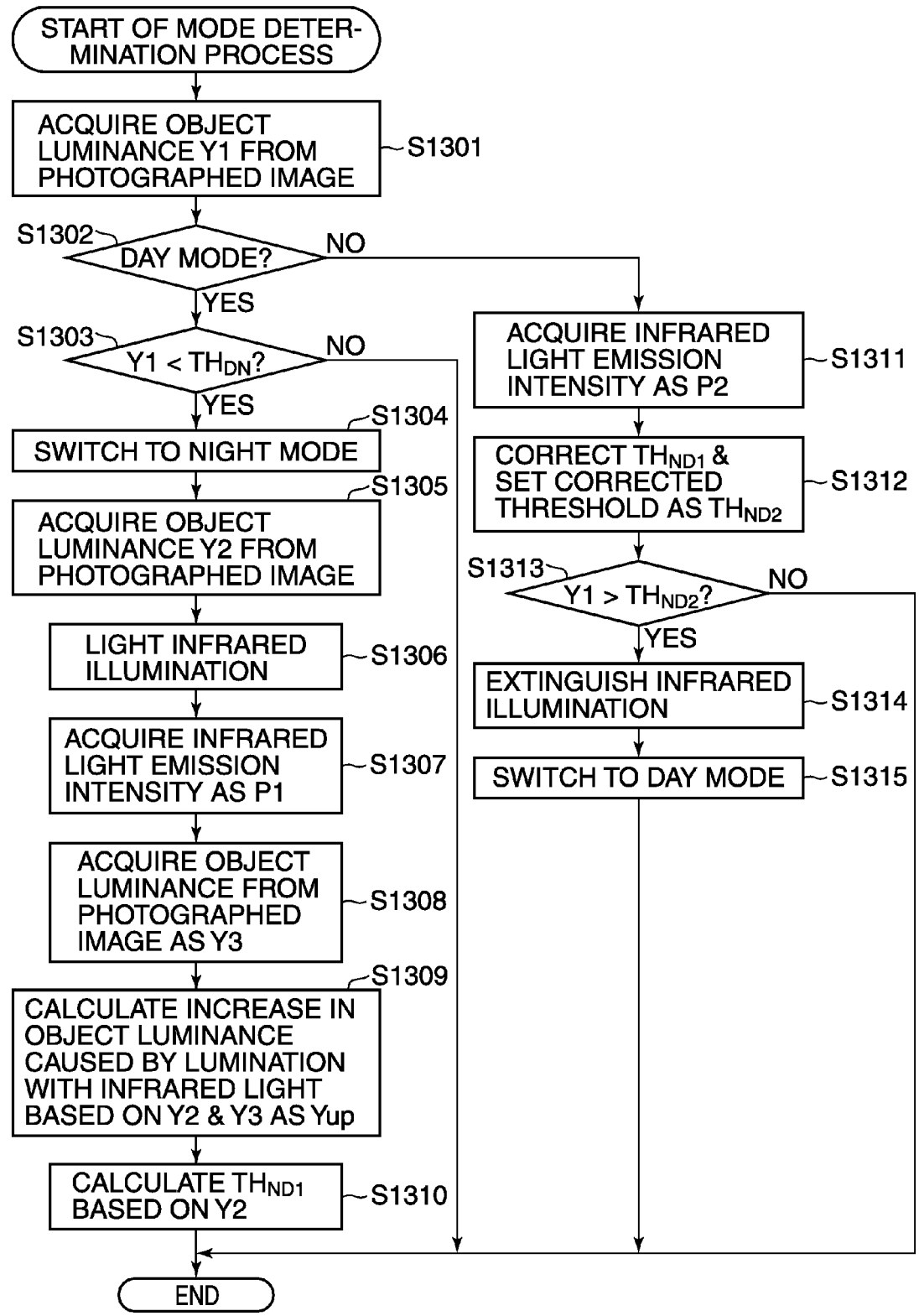
FIG. 13 is a flowchart of a mode determination process for a mode switching operation performed by the digital camera shown in FIG. 11.

FIG. 13 is a flowchart of a mode determination process for the mode switching operation performed by the camera shown in FIG. 11. The mode determination process in FIG. 13 is performed under the control of the camera control circuit 21, and is, for example, automatically and repeatedly executed when the camera is in the power-on state.

When the mode determination process is started, the camera control circuit 21 obtains a luminance detection result (object luminance Y1) from the photometric circuit 26 (step S1301). Then, the camera control circuit 21 determines whether or not the current photographing mode is the day mode (i.e. a color photographing mode) (step S1302).

If the current photographing mode is the day mode (YES to the step S1302), the camera control circuit 21 compares the object luminance Y1 with a first switching threshold value $TH_{DN}$ set in advance, and determines whether or not the object luminance Y1<the first switching threshold value $TH_{DN}$ holds (step S1303).

The first switching threshold value $TH_{DN}$ is a threshold value with reference to which the photographing mode is switched from the day mode to the night mode.

If the object luminance Y1<the first switching threshold value $TH_{DN}$ holds (i.e. the object luminance Y1 is lower than the first switching threshold value) (YES to the step S1303), the camera control circuit 21 switches the photographing mode from the day mode to the night mode (i.e. the monochrome photographing mode) (step S1304). In accordance with the switching from the day mode to the night mode, the camera control circuit 21 controls the infrared cut filter control circuit 25 to remove the infrared cut filter 4 from the optical axis 2.

Then, the camera control circuit 21 obtains a luminance detection result from the photometric circuit 26 as the object luminance Y2 (step S1305). As mentioned above, since the infrared cut filter is removed and the sensitivity is increased in the night mode, the object luminance in the night mode is set as Y2. Note that under a photographic environment containing infrared light, the object luminance Y2 is sometimes not lower than the object luminance Y1.

Next, the camera control circuit 21 causes the infrared illumination control circuit 28 to light the infrared illumination section 11 so as to illuminate the object with infrared light (step S1306). Then, the camera control circuit 21 obtains the intensity of light emission by the infrared illumination section 11 from the infrared illumination control circuit 28 as a light emission intensity P1 (step S1307).

Then, the camera control circuit 21 obtains a luminance detection result from the photometric circuit 26 as an object luminance Y3 (step S1308). Here, since the object is illuminated with infrared light, the object luminance under infrared illumination is set as the object luminance Y3. Note that the object luminance Y3 under infrared illumination is generally not lower than the object luminance Y2.

After that, the camera control circuit 21 calculates a difference between the object luminance Y2 and the object luminance Y3, and sets the difference as an object luminance rise value Yup which is an increase in object luminance caused by illumination with infrared light (step S1309).

Then, the camera control circuit 21 calculates a second switching threshold value $TH_{ND1}$ with reference to which the photographing mode is switched from the night mode to the day mode, based on the object luminance Y2 (step S1310). Then, the camera control circuit 21 terminates the mode determination process.

The second switching threshold value $TH_{ND1}$ is calculated e.g. by an equation $TH_{ND1}=Y2+\alpha$. The variable $\alpha$ represents hysteresis for preventing occurrence of hunting in switching the photographing mode, and when the variable $\alpha$ is set to a larger value, it is possible to more proactively prevent occurrence of hunting. On the other hand, when the variable $\alpha$ is set to a smaller value, it is possible to more quickly switch the photographing mode from the night mode to the day mode.

If the object luminance $Y1 \geq$ the first switching threshold value $TH_{DN}$ holds (the object luminance Y1 is not lower than the first switching threshold value) (NO to the step S1303), the camera control circuit 21 terminates the mode determination process.

If the current photographing mode is not the day mode (NO to the step S1302), i.e. if the current photographing mode is the night mode, the camera control circuit 21 obtains the intensity of light emission by the infrared illumination section 11 from the infrared illumination control circuit 28 as a light emission intensity P2 (step S1311).

If there is a change in intensity of light emission by the infrared illumination section 11 after switching the photographing mode to the night mode, the light emission intensity P2 is different from the light emission intensity P1. On the other hand, if there is no change in intensity of light emission by the infrared illumination section 11 after switching the photographing mode to the night mode, the light emission intensity P2 is equal to the light emission intensity P1.

Then, the camera control circuit 21 corrects the second switching threshold value $TH_{ND1}$ obtained in the step S1310, and sets the corrected threshold value as a third switching threshold value $TH_{ND2}$ (step S1312). Here, the camera control circuit 21 corrects the second switching threshold value $TH_{ND1}$ by adding an increase value (correction value) of the object luminance caused by illumination with infrared light. In doing this, the correction value becomes larger as the intensity of light emission by the infrared illumination section 11 is higher, and becomes smaller as the intensity of light emission is lower.

When the light emission intensity P2 is equal to 0 (unlighted state), the correction value becomes equal to 0, and when the light emission intensity P2 is equal to the light emission intensity P1, the correction value becomes equal to the object luminance rise value Yup corresponding to an amount of increase in the object luminance. Therefore, the third switching threshold value $TH_{ND2}$ is calculated e.g. by an equation $TH_{ND2}=TH_{ND1}+(Yup \times P2/P1)$. Note that P2/P1 represents a rate of change of the light emission intensity.

The camera control circuit 21 may perform correction based on a correction data table recorded in the internal memory or the like in advance. In this correction data table, for example, a correction value for correction is defined according to the relationship between the object luminance and the light emission intensity.

Further, the amount of increase in the object luminance caused by illumination with infrared light also varies with a distance to an object, temperature of the infrared illumination section 11, and age deterioration (i.e. aging) of the infrared illumination section 11, and hence it is possible to more accurately perform correction by taking into account these factors.

Then, the camera control circuit 21 compares the object luminance Y1 with the third switching threshold value $TH_{ND2}$, and determines whether or not the object luminance Y1>the third switching threshold value $TH_{ND2}$ holds (step S1313). If the object luminance Y1>the third switching threshold value $TH_{ND2}$ holds (YES to the step S1313), the camera control circuit 21 causes the infrared illumination control circuit 28 to extinguish the infrared illumination section 11 (step S1314). That is, the camera control circuit 21 causes light emission by the infrared illumination section 11 to be stopped.

After that, the camera control circuit 21 switches the photographing mode from the night mode to the day mode (step S1315). In doing this, in accordance with the switching from the night mode to the day mode, the camera control circuit 21 controls the infrared cut filter control circuit 25 to insert the infrared cut filter 4 onto the optical axis 2. Then, the camera control circuit 21 terminates the mode determination process.

If the object luminance $Y1 \leq$ the third switching threshold value $TH_{ND2}$ holds (NO to the step S1313), the camera control circuit 21 terminates the mode determination process.

As described above, in the third embodiment, the second switching threshold value with reference to which the photographing mode is switched from the night mode to the day mode is corrected according to the intensity of light emission by the infrared illumination section 11, and hence it is possible to prevent the photographing mode from being unexpectedly switched due to the influence of the light emission intensity.

Although in the above description, in the step S1312, the second switching threshold value with reference to which the photographing mode is switched from the night mode to the day mode is corrected by adding an amount of increase in the object luminance caused by illumination with infrared light, the second switching threshold value may be corrected by subtracting the amount of increase in the object luminance caused by illumination with infrared light from the object luminance.

As is clear from the above, in the third embodiment, the photometric circuit 26 functions as a detection unit, and the camera control circuit 21 functions as a correction unit. Further, the camera control circuit 21 and the infrared cut filter insertion/removal motor 6 function as a control unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-220205 filed Oct. 29, 2014, No. 2014-220206 filed Oct. 29, 2014, and No. 2014-220204 filed Oct. 29, 2014, which are hereby incorporated by reference herein in their entirety.

What is claimed is:

1. An image pickup apparatus including an image pickup device that has an optical image formed thereon through a photographic optical system, and outputs an image signal corresponding to the optical image, the image pickup apparatus comprising:
   an infrared light reduction unit configured to be inserted between the photographic optical system and the image pickup device so as to reduce an amount of infrared light contained in the optical image reaching the image pickup device;
   a first detection unit configured to detect a luminance of an object according to the image signal to thereby obtain a first detection result;
   a second detection unit disposed at a location different from a location of the image pickup device and configured to detect a luminance of the object to thereby obtain a second detection result;
   a processing unit configured to, in a case where the first detection result is lower than a first switching threshold value set in advance, generate a second switching threshold value used for comparison with the first detection result and a third switching threshold value used for comparison with the second detection result, based on the first detection result, the second detection result, and the first switching threshold value, and make one of the second switching threshold value and the third switching threshold value equal to or higher than the other of the second switching threshold value and the third switching threshold value, wherein (a) the processing unit is further configured to perform a comparison between (i) a difference between the first detection result and the second detection result and (ii) a difference threshold value set in advance, and the making one of the second switching threshold value and the third switching threshold value equal to or higher than the other of the second switching threshold value and the third switching threshold value is performed in accordance with the comparison, or (b) the processing unit is further configured to perform a comparison between (i) a ratio between the first detection result and the second detection result and (ii) a ratio threshold value set in advance, and the making one of the second switching threshold value and the third switching threshold value equal to or higher than the other of the second switching threshold value and the third switching threshold value is performed in accordance with the comparison, or (c) the processing unit is further configured perform a comparison between the first detection result and the second detection result, and the making one of the second switching threshold value and the third switching threshold value equal to or higher than the other of the second switching threshold value and the third switching threshold value is performed in accordance with the comparison; and
   an insertion/removal control unit configured to perform insertion/removal control for selectively inserting or removing said infrared light reduction unit into or from an optical path between the photographic optical system and the image pickup device, based on the first detection result, the second detection result, the second switching threshold value, and the third switching threshold value.

2. The image pickup apparatus according to claim 1, wherein in a case where a first determination result is obtained which indicates either that the difference between the first detection result and the second detection result is smaller than the difference threshold value set in advance, or that the first detection result is higher than the second detection result, said processing unit performs first processing for generating the second switching threshold value based on the first switching threshold value, generating the third switching threshold value based on the second detection result, and making the third switching threshold value equal to or higher than the second switching threshold value.

3. The image pickup apparatus according to claim 2, wherein in a case where a second determination result is obtained which indicates that the difference between the first detection result and the second detection result is not smaller than the difference threshold value set in advance, and also that the first detection result is not higher than the second detection result, said processing unit performs second processing for generating the third switching threshold value based on the first switching threshold value, generating the second switching threshold value based on the first detection result, and making the second switching threshold value equal to or higher than the third switching threshold value.

4. The image pickup apparatus according to claim 1, wherein in a case where a first determination result is obtained which indicates either that the ratio between the first detection result and the second detection result is lower than the ratio threshold value set in advance, or that the first detection result is higher than the second detection result, said processing unit performs first processing for generating the second switching threshold value based on the first switching threshold value, generating the third switching threshold value based on the second detection result, and making the third switching threshold value equal to or higher than the second switching threshold value.

5. The image pickup apparatus according to claim 4, wherein in a case where a second determination result is obtained which indicates that the ratio between the first detection result and the second detection result is not lower than the ratio threshold value set in advance, and also that the first detection result is not higher than the second detection result, said processing unit performs second processing for generating the third switching threshold value based on the first switching threshold value, generating the second switching threshold value based on the first detection result, and making the second switching threshold value equal to or higher than the third switching threshold value.

6. The image pickup apparatus according to claim 1, further comprising a mode switching control unit configured to switch a photographing mode to a color photographing mode in accordance with insertion of said infrared light reduction unit into the optical path, and switch the photographing mode to a monochrome photographing mode in accordance with removal of said infrared light reduction unit from the optical path.

7. The image pickup apparatus according to claim 6, wherein in a case where the first detection result is higher than the second switching threshold value, and also the second detection result is higher than the third switching threshold value, said mode switching control unit switches the photographing mode from the color photographing mode to the monochrome photographing mode.

8. The image pickup apparatus according to claim 6, wherein in a case where the photographing mode is the color photographing mode, when the first detection result is lower than the first switching threshold value, said mode switching control unit switches the photographing mode to the monochrome photographing mode.

9. The image pickup apparatus according to claim 3, further comprising an illuminating unit configured to illuminate the object with infrared light,
wherein in a case where the photographing mode is the monochrome photographing mode in which said infrared light reduction unit is removed from the optical path, when illumination by said illuminating unit is being performed, said processing unit performs the first or second processing in accordance with the first determination result or the second determination result.

10. The image pickup apparatus according to claim 9, wherein in a case where the photographing mode is the monochrome photographing mode, when illumination by said illuminating unit is not being performed, said processing unit performs third processing for generating the second switching threshold value based on the first detection result.

11. The image pickup apparatus according to claim 9, further comprising a mode switching control unit configured to, in a case where the photographing mode is the monochrome photographing mode, when illumination by said illuminating unit is being performed, change the photographing mode from the monochrome mode to the color photographing mode in which said infrared light reduction unit is inserted into the optical path in a case where the first detection result is higher than the second switching threshold value, and also the second detection result is higher than the third switching threshold value.

12. The image pickup apparatus according to claim 9, further comprising a mode switching control unit configured to, in a case where the photographing mode is the monochrome photographing mode, when illumination by said illuminating unit is not being performed, change the photographing mode from the monochrome mode to the color photographing mode in which said infrared light reduction unit is inserted into the optical path in a case where the first detection result is higher than the second switching threshold value.

13. A method of controlling an image pickup apparatus including an image pickup device that has an optical image formed thereon through a photographic optical system, and outputs an image signal corresponding to the optical image, and an infrared light reduction unit configured to be inserted between the photographic optical system and the image pickup device so as to reduce an amount of infrared light contained in the optical image reaching the image pickup device, the method comprising:
    detecting a luminance of an object according to the image signal to thereby obtain a first detection result;
    detecting a luminance of the object using a luminance sensor disposed at a location different from a location of the image pickup device to thereby obtain a second detection result;
    generating, in a case where the first detection result is lower than a first switching threshold value set in advance, a second switching threshold value used for comparison with the first detection result and a third switching threshold value used for comparison with the second detection result, based on the first detection result, the second detection result, and the first switching threshold value, and making one of the second switching threshold value and the third switching threshold value equal to or higher than the other of the second switching threshold value and the third switching threshold value, wherein (a) the generating comprises performing a comparison between (i) a difference between the first detection result and the second detection result and (ii) a difference threshold value set in advance, and the making one of the second switching threshold value and the third switching threshold value equal to or higher than the other of the second switching threshold value and the third switching threshold value is performed in accordance with the comparison, or (b) the generating comprises performing a comparison between (i) a ratio between the first detection result and the second detection result and (ii) a ratio threshold value set in advance, and the making one of the second switching threshold value and the third switching threshold value equal to or higher than the other of the second switching threshold value and the third switching threshold value is performed in accordance with the comparison, or (c) the generating comprises performing a comparison between the first detection result and the second detection result, and the making one of the second switching threshold value and the third switching threshold value equal to or higher than the other of the second switching threshold value and the third switching threshold value is performed in accordance with the comparison; and
    performing insertion/removal control for selectively inserting or removing the infrared light reduction unit into or from an optical path between the photographic optical system and the image pickup device, based on the first detection result, the second detection result, the second switching threshold value, and the third switching threshold value.

14. A non-transitory computer-readable storage medium storing a computer-executable control program for causing a computer to execute a method of controlling an image pickup apparatus including an image pickup device that has an optical image formed thereon through a photographic optical system, and outputs an image signal corresponding to the optical image, and an infrared light reduction unit configured to be inserted between the photographic optical system and the image pickup device so as to reduce an amount of infrared light contained in the optical image reaching the image pickup device, wherein the method comprises:

detecting a luminance of an object according to the image signal to thereby obtain a first detection result;

detecting a luminance of the object using a luminance sensor disposed at a location different from a location of the image pickup device to thereby obtain a second detection result;

generating, in a case where the first detection result is lower than a first switching threshold value set in advance, a second switching threshold value used for comparison with the first detection result and a third switching threshold value used for comparison with the second detection result, based on the first detection result, the second detection result, and the first switching threshold value, and making one of the second switching threshold value and the third switching threshold value equal to or higher than the other of the second switching threshold value and the third switching threshold value, wherein (a) the generating comprises performing a comparison between (i) a difference between the first detection result and the second detection result and (ii) a difference threshold value set in advance, and the making one of the second switching threshold value and the third switching threshold value equal to or higher than the other of the second switching threshold value and the third switching threshold value is performed in accordance with the comparison, or (b) the generating comprises performing a comparison between (i) a ratio between the first detection result and the second detection result and (ii) a ratio threshold value set in advance, and the making one of the second switching threshold value and the third switching threshold value equal to or higher than the other of the second switching threshold value and the third switching threshold value is performed in accordance with the comparison, or (c) the generating comprises performing a comparison between the first detection result and the second detection result, and the making one of the second switching threshold value and the third switching threshold value equal to or higher than the other of the second switching threshold value and the third switching threshold value is performed in accordance with the comparison; and performing insertion/removal control for selectively inserting or removing the infrared light reduction unit into or from an optical path between the photographic optical system and the image pickup device, based on the first detection result, the second detection result, the second switching threshold value, and the third switching threshold value.

\* \* \* \* \*